(12) United States Patent
Huff

(10) Patent No.: US 11,035,496 B2
(45) Date of Patent: Jun. 15, 2021

(54) THREE-WAY MICROVALVE DEVICE AND METHOD OF FABRICATION

(71) Applicant: CORPORATION FOR NATIONAL RESEARCH INITIATIVES, Reston, VA (US)

(72) Inventor: Michael A. Huff, Oakton, VA (US)

(73) Assignee: CORPORATION FOR NATIONAL RESEARCH INITIATIVES, Reston, VA (US)

( * ) Notice: Subject to any disclaimer, the term of this patent is extended or adjusted under 35 U.S.C. 154(b) by 0 days.

(21) Appl. No.: 16/397,729

(22) Filed: Apr. 29, 2019

(65) Prior Publication Data

US 2020/0025311 A1 Jan. 23, 2020

Related U.S. Application Data

(62) Division of application No. 14/872,202, filed on Oct. 1, 2015, now Pat. No. 10,323,772.

(51) Int. Cl.
  *F16K 99/00* (2006.01)

(52) U.S. Cl.
  CPC ...... *F16K 99/0028* (2013.01); *F16K 99/0025* (2013.01); *F16K 99/0038* (2013.01); *F16K 99/0042* (2013.01); *F16K 99/0048* (2013.01); *F16K 99/0055* (2013.01); *F16K 2099/0074* (2013.01); *F16K 2099/0082* (2013.01)

(58) Field of Classification Search
  CPC ............. F16K 99/0028; F16K 99/0025; F16K 99/0042; F16K 99/0048; F16K 99/0055; F16K 99/0039; F16K 2099/0082; F16K 2099/0074
  See application file for complete search history.

(56) References Cited

U.S. PATENT DOCUMENTS

| 5,271,431 A | * | 12/1993 | Mettner | ............. F15C 5/00 137/819 |
| 5,671,905 A | ‡ | 9/1997 | Hopkins, Jr. | ............. F03C 7/00 251/129.01 |

(Continued)

*Primary Examiner* — Michael R Reid
(74) *Attorney, Agent, or Firm* — Nixon & Vanderhye P.C.

(57) ABSTRACT

A three-way (3-way) Micro-Electro-Mechanical Systems (MEMS)-based micro-valve device and method of fabrication for the implementation of a three-way MEMS-based micro-valve are disclosed. The micro-valve device has a wide range of applications, including medical, industrial control, aerospace, automotive, consumer electronics and products, as well as any application(s) requiring the use of three-way micro-valves for the control of fluids. The discloses three-way micro-valve device and method of fabrication that can be tailored to the requirements of a wide range of applications and fluid types, and can also use a number of different actuation methods, including actuation methods that have very small actuation pressures and energy densities even at higher fluidic pressures. This is enabled by a novel pressure-balancing scheme, wherein the fluid pressure balances the actuator mechanism so that only a small amount of actuation pressure (or force) is needed to switch the state of the actuator and device from open to closed, or closed to open.

19 Claims, 15 Drawing Sheets

(56) References Cited

U.S. PATENT DOCUMENTS

| | | | | |
|---|---|---|---|---|
| 6,142,444 | A | * | 11/2000 | Kluge ............... F15C 3/04 137/831 |
| 6,837,476 | B2 | ‡ | 1/2005 | Cabuz ............... F16C 5/00 251/129.01 |
| 7,124,773 | B2 | * | 10/2006 | Midtgard ........... F16K 31/004 137/487.5 |
| 7,217,395 | B2 | ‡ | 5/2007 | Sander ............... B01L 3/0268 347/48 |
| 8,007,704 | B2 | ‡ | 8/2011 | Smith ............... B29C 45/14811 264/272.11 |
| 8,480,057 | B2 | * | 7/2013 | Takahashi ......... F16K 99/0048 251/333 |
| 8,628,055 | B2 | ‡ | 1/2014 | Shannon ........... F16K 31/02 251/129.01 |
| 9,586,411 | B2 | ‡ | 3/2017 | Guidotti ............ B41J 2/14201 |
| 2002/0043638 | A1 | * | 4/2002 | Kao ................... F15C 5/00 251/129.06 |
| 2003/0080085 | A1 | * | 5/2003 | Greenberg ........ F16K 99/0001 216/20 |
| 2005/0272079 | A1 | * | 12/2005 | Burns ................ B01F 13/0093 435/6.19 |
| 2011/0073788 | A1 | * | 3/2011 | Marcus ............. F16K 99/0007 251/30.01 |
| 2015/0300526 | A1 | * | 10/2015 | Livermore-Clifford ............... F16K 99/0048 251/12 |

\* cited by examiner
‡ imported from a related application

Possible 3-way Microvalve States for 2 inlet ports and 1 outlet port device configuration of Figure 1

| State | Inlet Port 1 | Inlet Port 2 | Outlet Port 3 | Resultant Flow Condition |
|---|---|---|---|---|
| State 1 | on | on | on | Flow from 1 and 2 through 3 |
| State 2 | on | on | off | No flow |
| State 3 | on | off | off | No flow |
| State 4 | off | on | off | No flow |
| State 5 | off | off | off | No flow |
| State 6 | on | off | on | Flow from 1 through 3 |
| State 7 | off | on | on | Flow from 2 through 3 |
| State 8 | off | off | on | No flow |

Figure 3

Possible 3-way Microvalve States for 1 inlet port and 2 outlet ports device configuration of Figure 2

| State | Inlet Port 1 | Outlet Port 2 | Outlet Port 3 | Resultant Flow Condition |
|---|---|---|---|---|
| State 1 | on | on | on | Flow from 1 through 2 and 3 |
| State 2 | on | on | off | Flow from 1 to 2 |
| State 3 | on | off | off | No flow |
| State 4 | off | on | off | No flow |
| State 5 | off | off | off | No flow |
| State 6 | on | off | on | Flow from 1 through 3 |
| State 7 | off | on | on | No flow |
| State 8 | off | off | on | No flow |

Figure 4

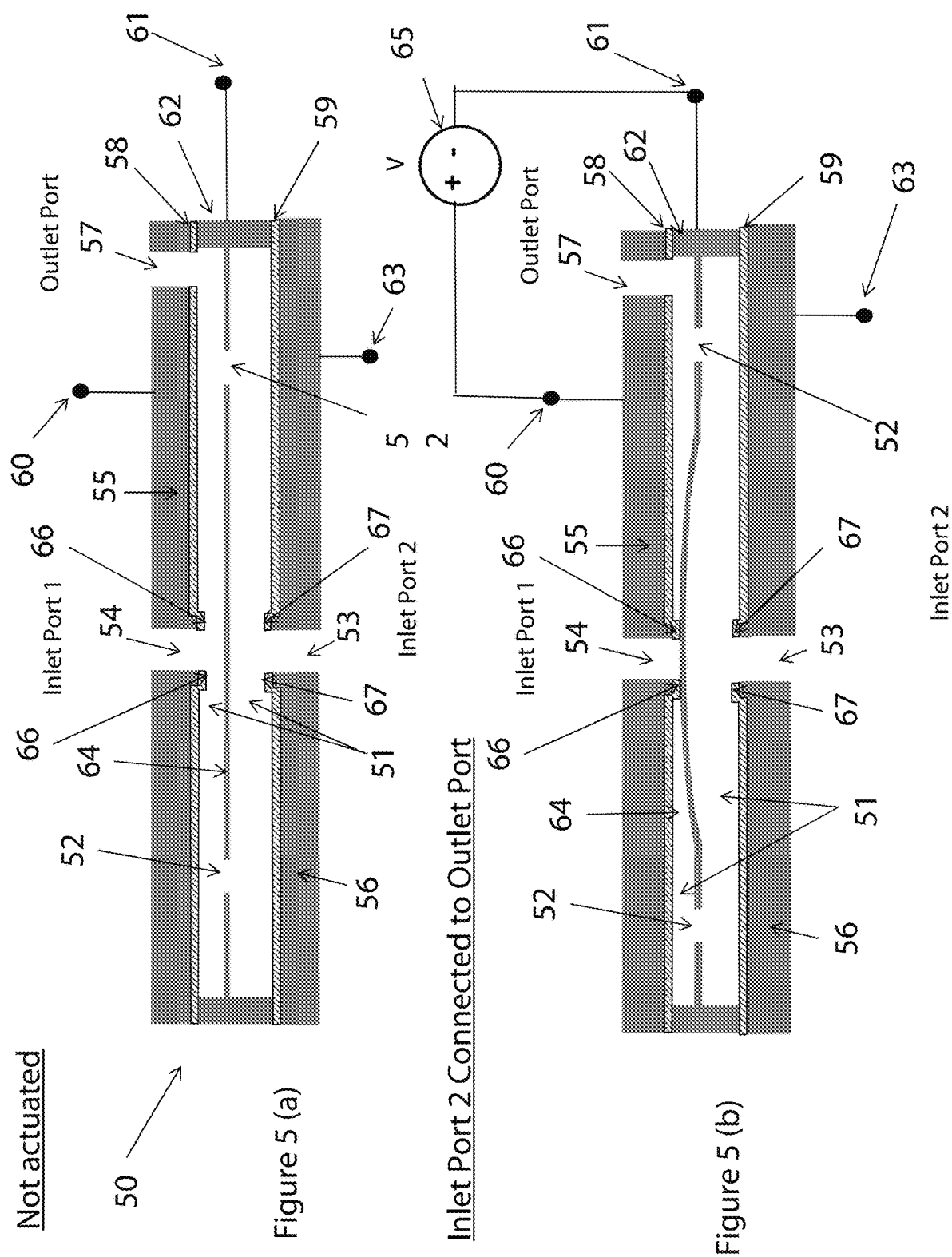

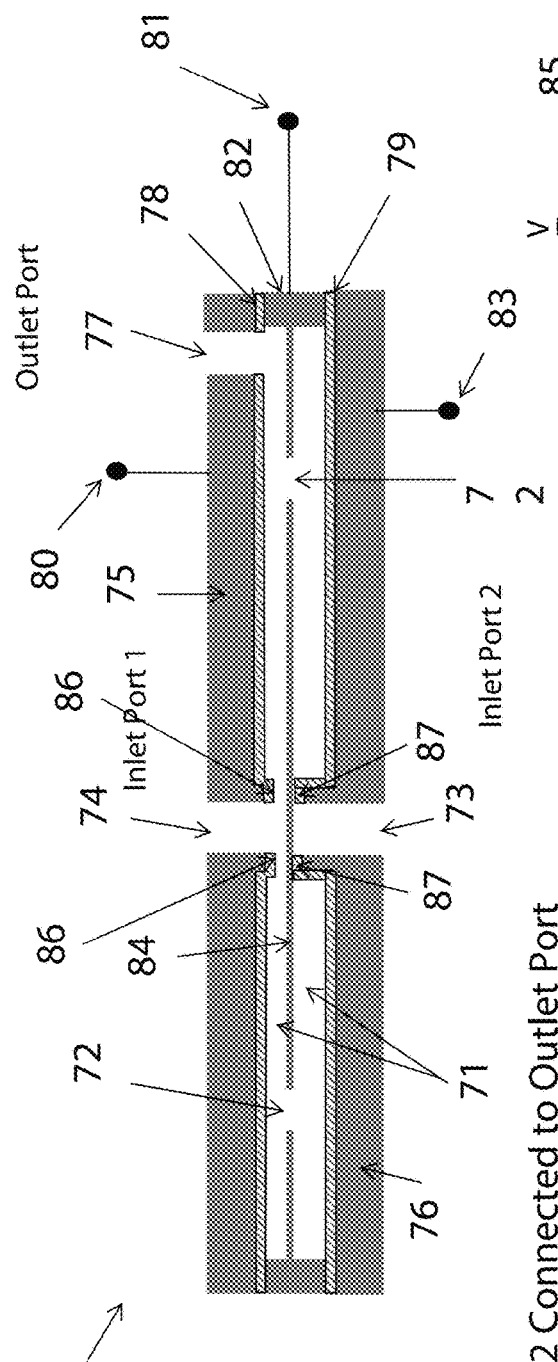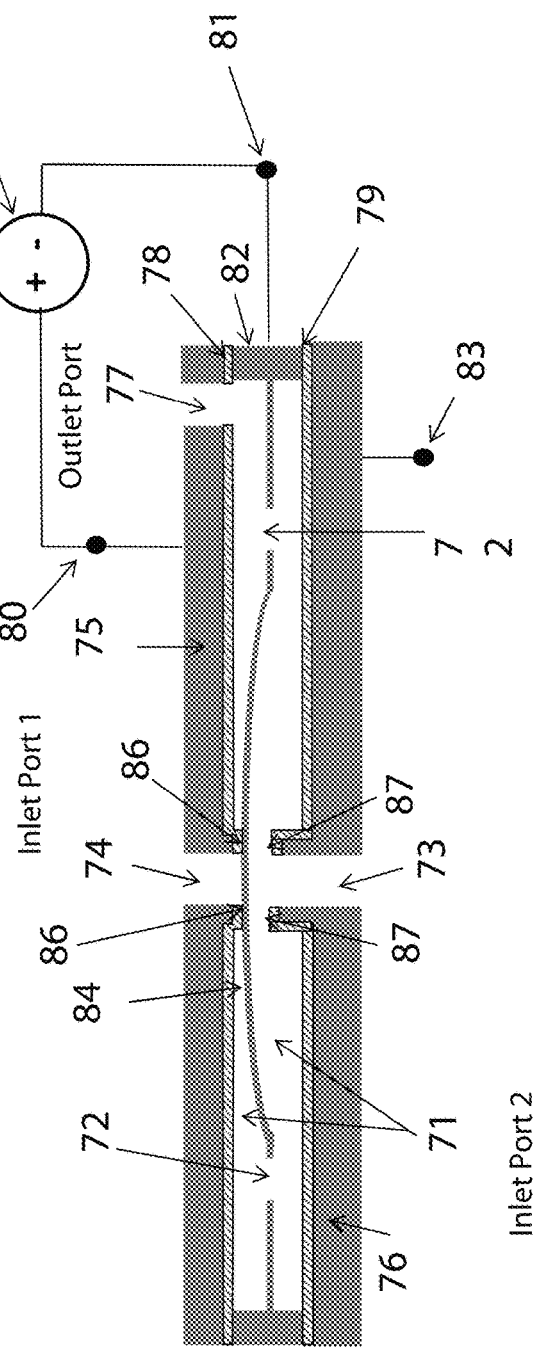
Figure 6(a) Inlet Port 1 Connected to Outlet Port
Figure 6(b) Inlet Port 2 Connected to Outlet Port

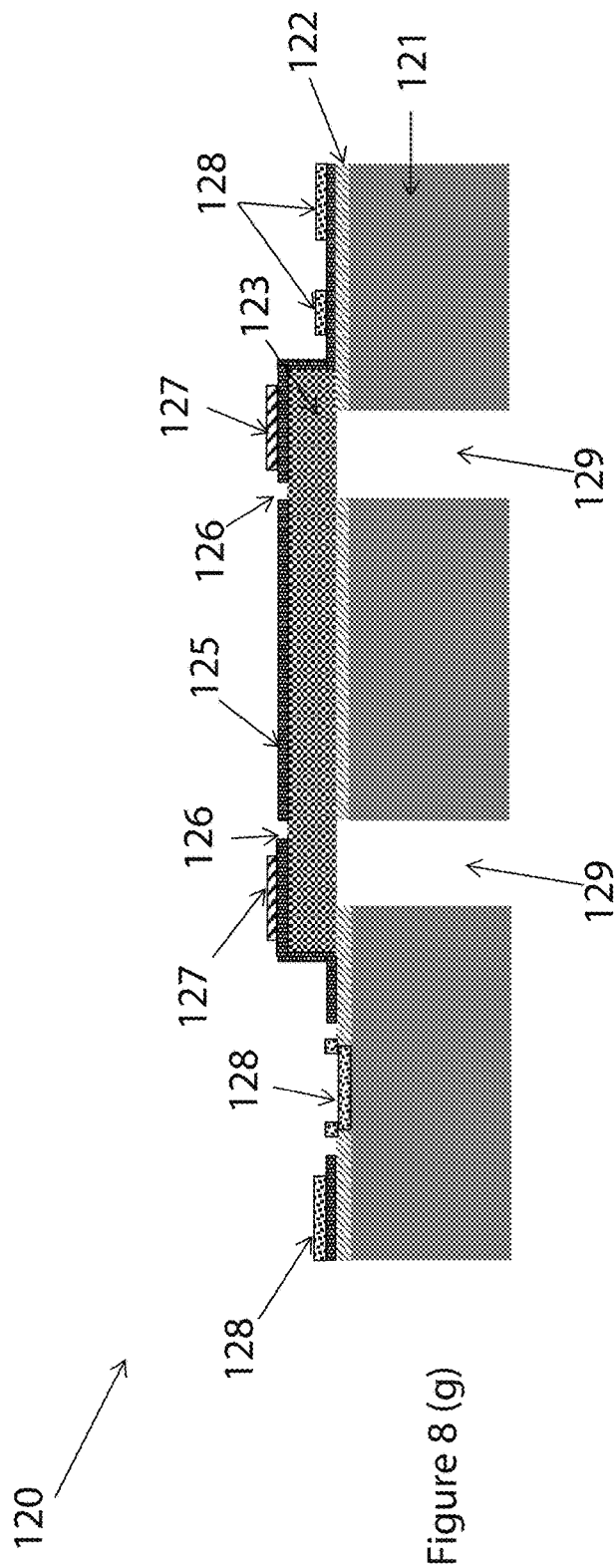
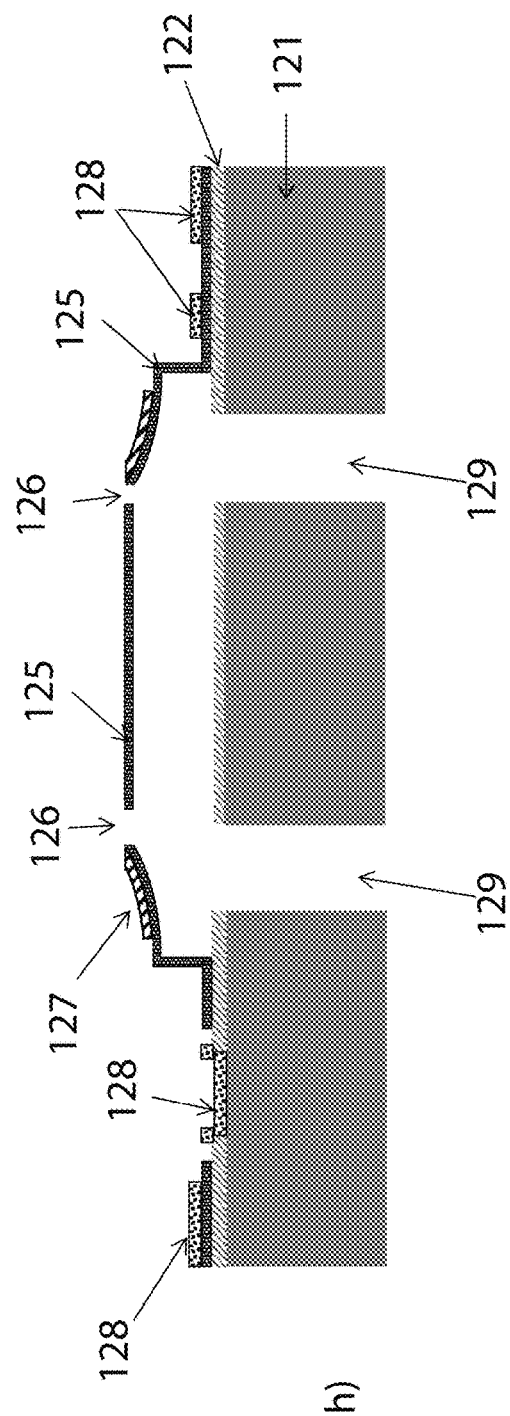
Figure 8 (g)
Figure 8 (h)

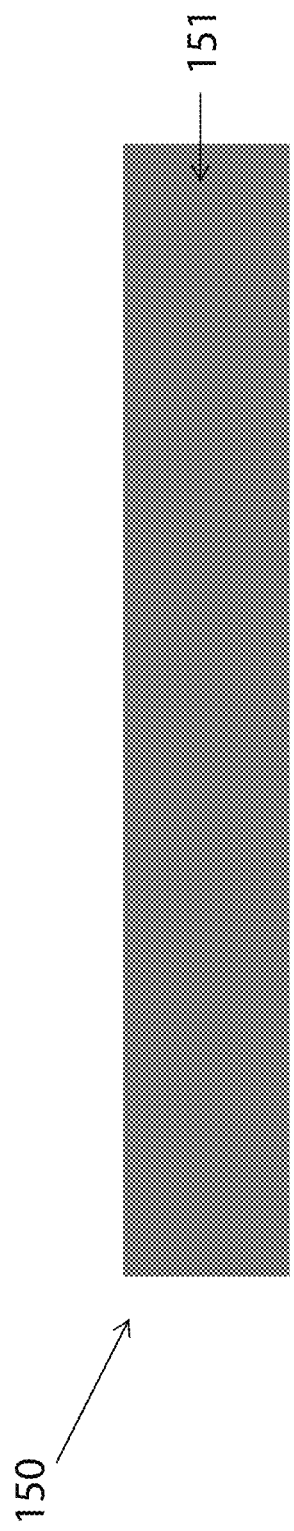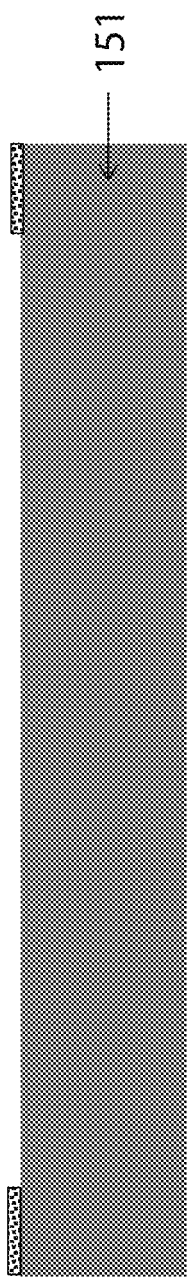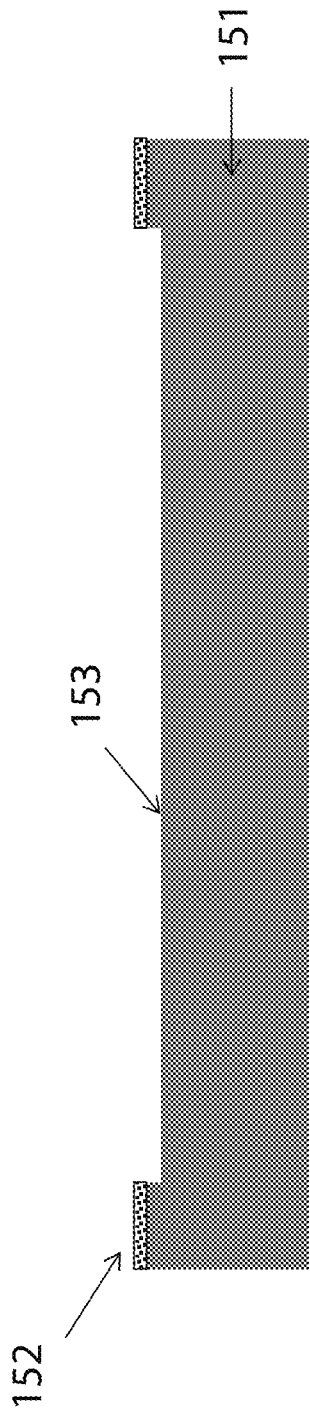

THREE-WAY MICROVALVE DEVICE AND METHOD OF FABRICATION

CROSS-REFERENCE TO RELATED APPLICATIONS

This application is a division of U.S. patent application Ser. No. 14/872,202 filed Oct. 1, 2015, incorporated herein in its entirety by reference.

STATEMENT REGARDING FEDERALLY SPONSORED RESEARCH OR DEVELOPMENT

This invention was made with government support under FA8651-13-C-0267 awarded by the Air Force. The government has certain rights in the invention.

FIELD OF INVENTION

The present invention is directed to a three-way (3-way) Micro-Electro-Mechanical Systems (MEMS)-based micro-valve device and a method of fabricating the device. The present invention involves a novel feature of using the fluid under control of the micro-valve to pressure balance the actuator and thereby enable small actuation forces to open and close the device. The present invention has a wide range of applications, including medical, industrial control, aerospace, automotive, consumer electronics and products, as well as any application(s) requiring the use of three-way micro-valves for the control of fluids.

BACKGROUND OF THE INVENTION

A number of MEMS-based micro-valves have been reported in the literature using a variety of actuation methods, including: pneumatic; electrostatic; thermo-pneumatic; shape-memory alloy (SMA); thermal bimetallic; piezoelectric; and electromagnetic.

All of these micro-valves previously reported in the literature have been 2-way devices that can merely "open" or "close" to allow the device to "turn on" or "turn off" the flow of fluid through the structure. Importantly, none of these devices can be operated as three-way micro-valves that can direct the flow of fluid in a preferred direction. This is partly due to the fact that MEMS is, in general, a relatively new technology, and specifically because MEMS-based micro-valves are even less mature. Consequently, the only available method for the implementation of a fluidic system wherein the fluid can be directed to a preferred direction has been to use at least a quantity of at least two (2) separate two-way micro-valves. However, this is an expensive solution that doubles the power required, size, weight and space, as well as reduces reliability, and therefore is not an optimal or preferred solution for many applications.

A major challenge for MEMS-based actuators in general, and micro-valves in particular, is the very low actuation forces that can be generated on the small dimensional size scales of the actuator elements. The resulting small actuation forces typically prevent these types of devices to be used where the actuator must overcome larger forces. For example, a typical electrostatically-actuated micro-valve will only generate less than a 1 psi (pound per square inch) of actuation pressure. Therefore, if the micro-valve actuator must overcome the fluid pressure in order to open and/or close the device to the flow of fluid, then the micro-valve would be restricted to applications where the fluid pressures are smaller than the actuation pressure, which is less than 1 psi.

Disclosed herein is a three-way micro-valve device and method of fabrication that can be tailored to the requirements of a wide range of applications. The disclosed 3-way micro-valve can use a number of different actuation methods, including actuation methods that have very small actuation pressures while being able to control fluid pressures much higher than the pressures that can be generated by the actuator. The micro-valve of the present invention employs a pressure balancing scheme so that it can be actuated while controlling fluid pressures much larger than the actuation pressure generated by the actuator.

SUMMARY OF INVENTION

The present invention is directed to a three-way (3-way) Micro-Electro-Mechanical Systems (MEMS)-based micro-valve device and method of fabrication for the implementation of a three-way MEMS-based micro-valve. The present invention has a wide range of applications, including medical, industrial control, aerospace, automotive, consumer electronics and products, as well as any application(s) requiring the use of three-way micro-valves for the control of fluids.

A major challenge for MEMS-based actuators in general, and micro-valves in particular, is the very low actuation forces that can be generated on the small dimensional size scales of the actuator elements. The resulting small actuation forces typically prevent these types of devices to be used where the actuator must overcome larger forces. For example, a typical electrostatically-actuated micro-valve will only generate less than a 1 psi (pound per square inch) of actuation pressure. Therefore, if the micro-valve actuator must overcome the fluid pressure in order to open and/or close, then the microvalve would be restricted to applications where the fluid pressures are smaller than the actuation pressure, that is, less than 1 psi The present invention allows for the implementation of a three-way micro-valve device and method of fabrication that can be tailored to the requirements of a wide range of applications and fluid types. The 3-way micro-valve disclosed can also use a number of different actuation methods, including actuation methods that have very small actuation pressures and energy densities even at higher fluidic pressures. This is enabled by a novel pressure-balancing scheme wherein the fluid pressure balances the actuator mechanism so that only a small amount of actuation pressure (or force) is needed to switch the state of the actuator and device from open to closed, or closed to open.

BRIEF DESCRIPTION OF THE DRAWINGS

FIG. 3 is a table showing the possible states of a three-way micro-valve having two inlet ports and one outlet port. These states are applicable to the three-way micro-valve of FIGS. 1(a) and 1(b).

FIG. 4 is a table showing the possible states of a three-way micro-valve having one inlet port and two outlet ports. These states are applicable to the three-way micro-valve of FIGS. 2(a) and 2(b).

FIGS. 6(a) and 6(b) are cross sectional drawings of a pressure-balanced, normally-closed, electrostatically-actuated, three-way micro-valve with two inlet ports and one outlet port.

DETAILED DESCRIPTION OF THE INVENTION

Figure 1:
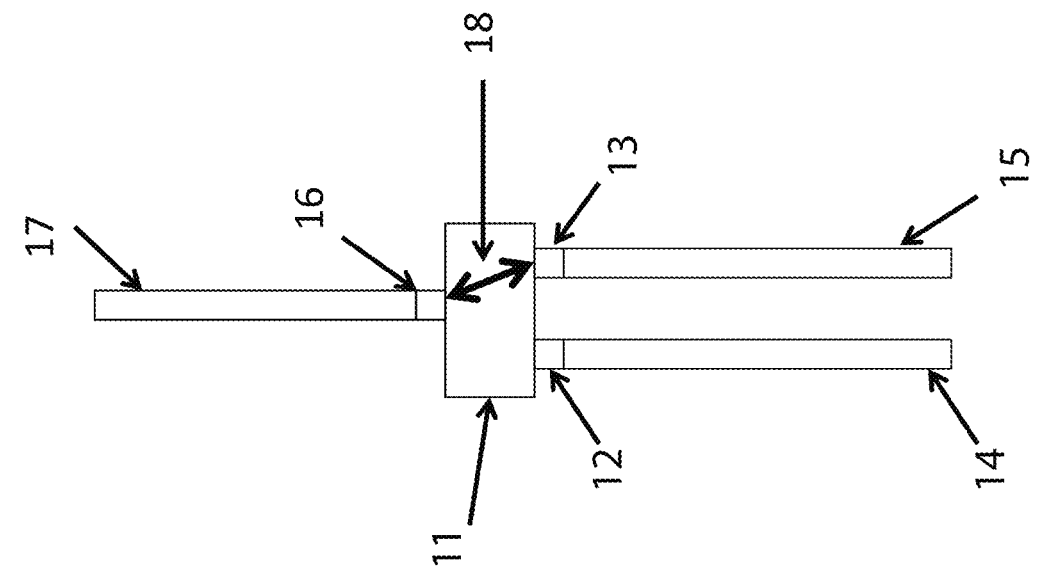
FIGS. 1(a) and 1(b) are an illustration of a three-way micro-valve with two inlet ports and one outlet port, and showing two functional states of the device.
Figure 1:
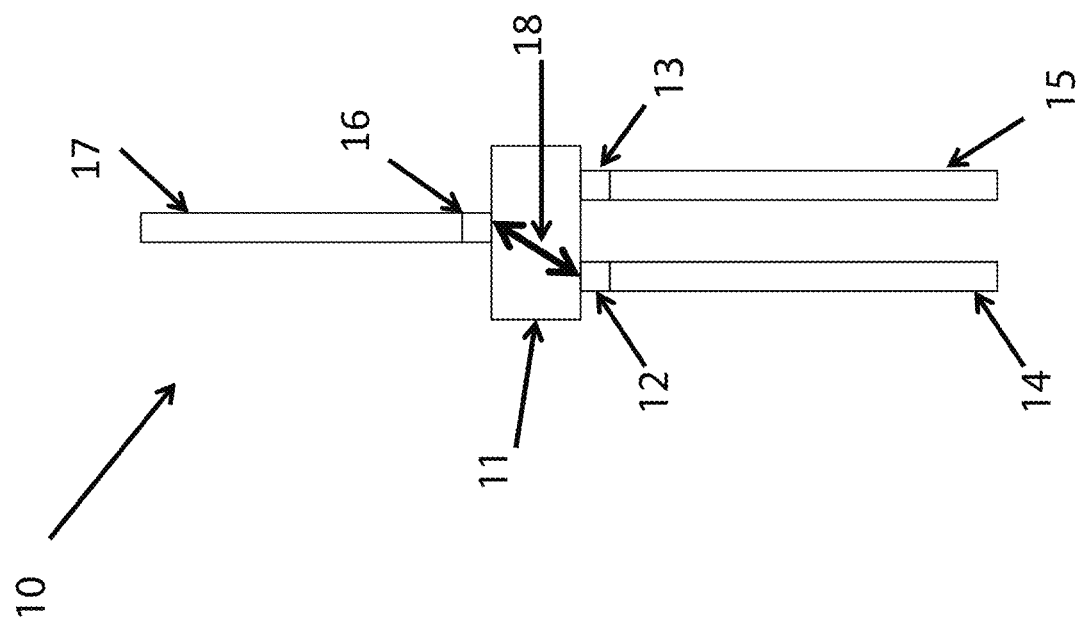

The present invention is directed to a three-way (3-way) Micro-Electro-Mechanical Systems (MEMS)-based micro-valve device and method of fabrication for the implementation of a three-way MEMS-based micro-valve. The present invention has a wide range of applications, including medical, industrial control, aerospace, automotive, consumer electronics and products, as well as any application(s) requiring the use of three-way micro-valves for the control of fluids.

The present invention allows for the implementation of a three-way micro-valve device and method of fabrication that can be tailored to the requirements of a wide range of applications and fluid types. The three-way micro-valve disclosed herein can also use a number of different actuation methods, including actuation methods that have very small actuation energy densities, and still be able to control the flow of fluids even at higher fluidic pressures. This is enabled by a novel pressure-balancing scheme wherein the fluid pressure balances the actuation so that only a small amount of actuation force or pressure is needed to switch the state of the actuator and device, even when the fluid pressure is much larger than the pressure that can be generated by the actuator.

FIGS. 1(a) and 1(b) and FIGS. 2(a) and 2(b) illustrate the functionality of the three-way micro-valve of the present invention. The micro-valve has three (3) fluidic ports (that is, openings into or out of the device structure through which fluid that is either a gas or a liquid or a combination of gas and liquid, can flow) with two (2) different micro-valve device configurations, with the first device configuration shown in FIGS. 1(a) and 1(b) and the second in FIGS. 2(a) and 2(b).

In one micro-valve device configuration 10, as shown in FIGS. 1(a) and 1(b), the micro-valve device 11 has two inlet fluidic ports, inlet port one, numbered 12 in FIGS. 1(a) and 1(b), and inlet port two, numbered 13 in FIGS. 1(a) and 1(b), that are used as inlet ports, thereby allowing fluid to flow into the micro-valve 11. That is, fluid can flow into the micro-valve device 11 through these inlet ports 12 and 13, through the micro-valve 11, and into, and through the remaining port, outlet port three, numbered 16 in FIGS. 1(a) and 1(b), if these ports are in an "open" state.

Inlet port1, numbered 12 in FIGS. 1(a) and 1(b), is connected to inlet fluid conduit 14, which is a fluid pathway into inlet port one 12 and the micro-valve device 11 in FIGS. 1(a) and 1(b). Outlet port three, numbered 16 in FIGS. 1(a) and 1(b), is connected to outlet fluid conduit 17 that is a fluid pathway out of the micro-valve device 11. Inlet port two, numbered 13 in FIGS. 1(a) and 1(b), is connected to fluid conduit 15 and is a fluid pathway into inlet port two 13 and the micro-valve 11 in FIGS. 1(a) and 1(b).

The micro-valve device 11 shown in FIGS. 1(a) and 1(b) has a fluidic switching mechanism 18, whereby either inlet port one, numbered 12 in FIGS. 1(a) and 1(b), or inlet port two, numbered 13 in FIGS. 1(a) and 1(b), is connected to outlet port three, numbered 16 in FIGS. 1(a) and 1(b). This fluidic switching mechanism 18 is shown in two of the switched states with the first switched state illustrated in FIG. 1(a) wherein inlet port one, numbered 12 in FIGS. 1(a) and 1(b), is fluidically connected to outlet port three, numbered 16 in FIGS. 1(a) and 1(b). That is, fluid can flow from conduit 14, through inlet port one 12, through the micro-valve 11, through the outlet port 16, and subsequently through conduit 17. In the state shown in FIG. 1(a), inlet port two, numbered 13 in FIGS. 1(a) and 1(b), is not connected to outlet port three, numbered 16 in FIGS. 1(a) and 1(b). That is, no fluid is allowed from conduit 15, through the inlet port two 13 and into the micro-valve 11, and therefore no fluid can flow through conduit 17 from inlet port two 13.

In the second switched state shown in FIG. 1(b), inlet port two, numbered 13 in FIGS. 1(a) and 1(b), is fluidically connected to outlet port three, numbered 16 in FIGS. 1(a) and 1(b) by the fluid switch 18 of the microvalve 11. That is, fluid can flow from conduit 15, through the inlet port two 13, through the microvalve 11, through the outlet port 16, and subsequently through conduit 17. In the state shown in FIG. 1b, inlet port one, numbered 12 in FIG. 1, is not connected to outlet port three, numbered 16 in FIGS. 1(a) and 1(b). That is, no fluid is allowed from conduit 14, through the inlet port one 12 and into the microvalve 11, and therefore no fluid can flow through conduit 17 from inlet port one 12.

In the second device configuration, as shown in FIGS. 2(a) and 2(b), the microvalve device 21 has one inlet fluidic port, inlet port one, numbered 26 in FIGS. 2(a) and 2(b), that is used as an inlet port, that is, fluid can flow into the microvalve device 21 through this inlet port 26. There are two outlet fluidic ports, with outlet port one numbered 22 in FIGS. 2(a) and 2(b), and outlet port two numbered 23 in FIGS. 2(a) and 2(b). These outlet ports 22 and 23 are used as outlet ports 22 and 23, whereby fluid can flow out of the microvalve device 21 that entered through inlet port one 26. Inlet port one, which is numbered 26 in FIGS. 2(a) and 2(b), is connected to inlet fluid conduit 27 that is a fluid pathway into the microvalve device 21. Outlet port one, which is numbered 22 in FIGS. 2(a) and 2(b), is connected to outlet fluid conduit 24 that is a fluid pathway out of the microvalve device 21. Outlet port two, which is numbered 23 in FIGS. 2(a) and 2(b), is connected to outlet fluid conduit 25 that is a fluid pathway out of the microvalve device 21.

The microvalve device 21 shown in FIGS. 2(a) and 2(b) has a switching mechanism 28 whereby the inlet port, which is numbered 26 in FIGS. 2(a) and 2(b), is connected to either outlet port one, numbered 22 in FIGS. 2(a) and 2(b), or outlet port two, numbered 23 in FIGS. 2(a) and 2(b).

Figure 2:
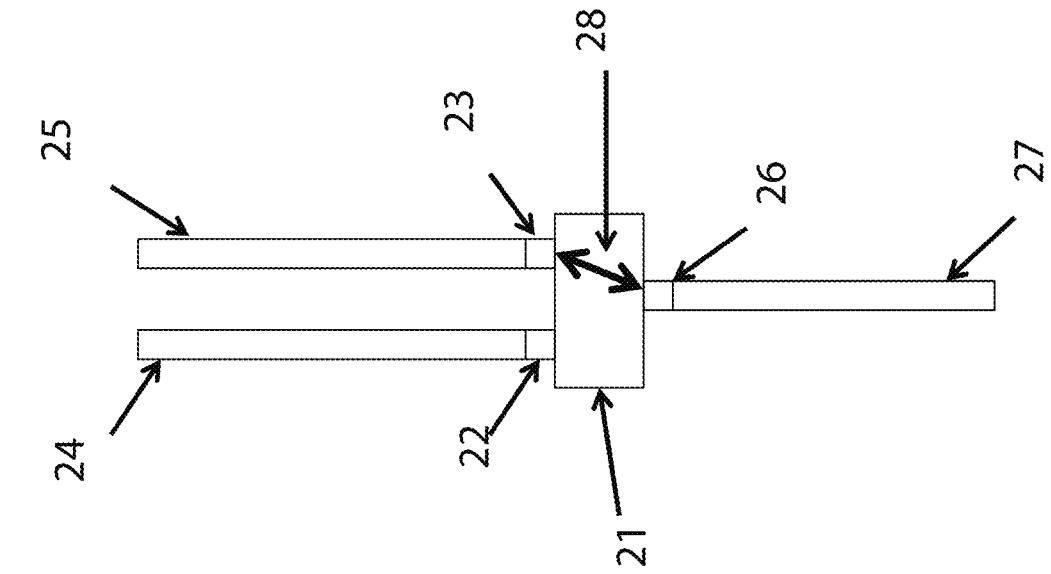
FIGS. 2(a) and 2(b) are an illustration of a three-way micro-valve with one inlet port and two outlet ports, and showing two functional states of the device.
Figure 2:
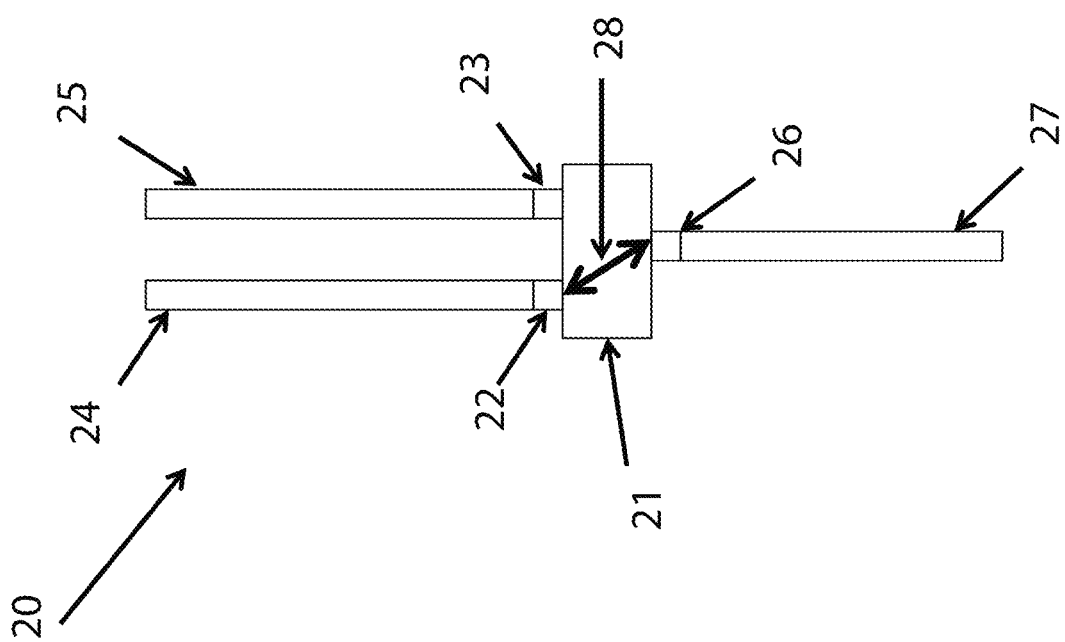

This switching mechanism 28 is shown in two states, with the first switched state illustrated in FIG. 2(*a*) wherein the inlet port, numbered 26 in FIG. 2(*a*), is fluidically connected to outlet port one, numbered 22 in FIG. 2(*a*). That is, fluid can flow from conduit 27, through the inlet port 26, through the micro-valve 21, through the outlet port one 22, and subsequently through conduit 24. In the state shown in FIG. 2(*a*), the inlet port, numbered 26 in FIG. 2(*a*), is not connected to outlet port two, numbered 23 in FIG. 2(*a*). That is, no fluid is allowed from conduit 27, through the micro-valve 21, and through conduit 25.

In the second switched state of FIGS. 2(*a*) and (*b*), shown in FIG. 2(*b*), the inlet port, numbered 26 in FIG. 2(*b*), is fluidically connected to outlet port two, numbered 23 in FIG. 2(*b*) by the micro-valve 21 switch mechanism 28. That is, fluid can flow from conduit 27, through the inlet port 26, through the micro-valve 21, through the outlet port two 23, and subsequently through conduit 25. In the state shown in FIG. 2(*b*), inlet port one, numbered 26 in FIG. 2(*b*), is not connected to outlet port one, numbered 22 in FIG. 2(*b*). That is, no fluid is allowed from conduit 27, through the micro-valve 21, and through conduit 24.

As can be seen from FIGS. 1(*a*) and 1(*b*) and FIGS. 2(*a*) and 2(*b*), the micro-valve is able to control the direction of the fluid from the inlet port(s) and conduit(s) to the outlet port(s) and conduit(s).

In general, the 3-way micro-valve of the device configuration of FIGS. 1(*a*) and 1(*b*), with two inlet ports and one outlet port, will have several possible states, as shown in the table 30 of FIG. 3, depending on which of the inlet ports and outlet port are either in an "on" or "off" state. As can be seen, five (5) of these states are essentially equivalent, in that no fluid is allowed to flow through the micro-valve device. Specifically, these are states 2, 3, 4, 5, and 8. Additionally, state 1, wherein fluid flows through the device with all ports open, is not of much interest since this state can be obtained without the presence of a valve by just having a branching from port 1 to ports 2 and 3. The two (2) states of primary interest are states 6 and 7 whereby the fluid can flow from inlet port 1 to outlet port 3 in State 6 and State 7, where the fluid can flow from inlet port 2 to outlet port 3.

Similarly, the 3-way micro-valve of the device configuration of FIGS. 2(*a*) and 2(*b*), with one inlet port and two outlet ports, also has several possible states, as shown in the table 40 of FIG. 4, depending on which of the inlet ports and outlet port are either in an "on" or "off" state. As in the previous case, there are five (5) states that allow no fluid to flow through the device. Specifically, these are states 3, 4, 5, 7, and 8. Additionally, state 1, wherein fluid flows through the device with all ports open, is not of much interest since this state can be obtained without the presence of a valve by just having a branching from ports 1 and 2 to port 3. The two (2) states of primary interest are states 2 and 6 whereby the fluid can from inlet port 1 to outlet port 2 in State 2 and State 6 where the fluid can flow from inlet port 1 to outlet port 3.

It is important to note that valves in general, and micro-valves in particular, may not exhibit all of the states shown in FIGS. 3 and 4. The ability of these devices to exhibit specific states is dependent on the specific design of the device, method of actuation, as well as other factors. Nevertheless, as noted above, many of the states are redundant (e.g., the "no flow" states) or have no particular interest in applications (e.g., the state with all ports open) and therefore the ability of a micro-valve device to exhibit less than all possible states is not limiting in most applications.

Another differentiating element of 3-way micro-valves is whether they are "normally open" or "normally closed." "Normally open" and "normally closed" describe the state or position of the valve when no actuation signal is applied to the device. That is, the natural or resting state of the device when no electrical power is applied to the device's actuator. Typically, a "normally closed" device would employ some kind of spring or mechanical force that results in the valve port or ports being closed when no power is applied to the micro-valve actuator. Conversely, a "normally open" micro-valve's ports are open when no power is applied. Whether the micro-valve is normally "open" or normally "closed" will depend on the exact design of the micro-valve, as well as the application requirements. The 3-way micro-valves of the present invention can be implemented in both the "normally open" or "normally closed" device configurations.

Typically, the actuation method employed in any micro-valve design is dictated by the requirements of the intended application. Typically these requirements would include: maximum flow rate, maximum pressure differential, operating temperatures, electrical power; size and weight; type of fluid to be controlled; as well as other factors.

The specific device requirements of a particular application will typically allow the number of viable actuation methods to be reduced. For example, in applications where the operational temperatures are relatively low or vary over a large range, the use of any type of thermally-initiated actuation methods such as thermal bimetallic, shape-memory alloy (SMA), and thermo-pneumatic may not be a good choice since all of these methods require heating of the actuator, and additionally, the actuator itself is temperature sensitive.

For example, shape-memory alloy and thermo-pneumatic actuators operate by heating an actuator material to induce a phase change, and therefore, the phase change temperature would have to be higher than the maximum operational temperature. Therefore, the operational temperatures are an important determiner of the choice of actuation method. Nevertheless, thermally-initiated actuation methods may have some significant advantages in some applications. For example, shape-memory alloy (SMA) actuators have several advantages compared to other actuation schemes, including: the actuation energy densities of SMA actuators are typically very high compared to other actuation methods and this allows the control of fluids at large pressure differentials; and the maximum allowable mechanical strains of SMA actuators are also very high (i.e., some SMA actuators have reported repeatable strain levels of around 8%) thereby enabling larger strokes and consequently larger flow rates at modest differential pressures. Thermo-pneumatic actuators also have very high actuation energy densities, but typically do not have large strokes since it is considered prudent to limit the strain levels of the materials used in the actuator to below 1%.

Often a very important criterion for selection of actuation method is the power requirements for the specific application. For example, for some applications the heating requirements of thermal-actuation methods may exceed the maximum desired device power requirements.

Additionally, pneumatic actuation approaches wherein an external pressure generator is required to provide pressures to actuate the device will increase the size (and power requirements) of the device considerably. Therefore, for some applications pneumatic actuation may not be an optimal approach.

Electromagnetic actuation is a popular method of actuation in macro-scale valves, but this type of actuation does not scale well to the MEMS size domain. Many MEMS-based electromagnetic actuation schemes require a mesoscale electromagnetic solenoid that must be attached to the valve mechanism and this increases the cost and size of the system considerably, and therefore, this actuation method may not be desirable for some applications. Alternatively, some MEMS-based electromagnetic actuation schemes attempt to integrate wire windings into the device structure, but this makes the fabrication very challenging and the maximum current that can be safely passed through small wires often limits the electromagnetic forces that can be generated using this approach.

Electrostatic and piezoelectric actuation methods are often employed for micro-valve devices. However, it is important to note that both of these approaches have small inherent strokes. That is, the amount of deflection of the actuator during actuation is relatively small. The resultant effect of a small stroke of the micro-valve is that the fluid flow pressure through the opening will be high in order to overcome flow resistance created by the small stroke, and therefore, this may limit the amount of fluid flow through the device when in an "open" state.

Another important point about electrostatic actuation is that the actuation energy densities or actuation pressures that can be generated using this actuation method are very small. The consequence of this is that a device using this actuation scheme may not be able to operate, that is actuate to open and/or close, at differential fluid pressures higher than can be generated by this type of actuator.

Piezoelectric actuation schemes, on the other hand, can generate very large actuation energy densities, and therefore, can be used in applications requiring operation at high differential fluid pressures. Typically, electrostatic actuation schemes are simpler to implement compared to piezoelectric actuation schemes. In fact, as a general rule, electrostatic-based actuation schemes will be the simplest to implement since it requires no additional or exotic materials such as in the case for shape-memory alloys, thermo-pneumatics, bimetallics and piezoelectrics.

The important point about actuation schemes for MEMS-based microvalves is that the requirements of the specific application will often dictate the type of actuator that can be used. The three-way micro-valve devices disclosed herein of the present invention can be used with any of the available actuation schemes.

Pressure-Balanced Three-Way Microvalve.

The first embodiment of a three-way micro-valve 50 of the present invention is shown in FIGS. 5(a)-5(c). The three-way microvalve 50 shown in FIGS. 5(a)-5(c) is electrostatically-actuated and also pressure-balanced as described herein. In FIG. 5(a), the micro-valve is shown an un-actuated state with both inlet port one and inlet port two both in an "open" state and connected to the outlet port so that fluid can flow through both of these ports and through the micro-valve outlet port. In FIG. 5(b) the device is shown in an actuated state with inlet port two in an "open" state and connected to the outlet port thereby allowing fluid to flow through inlet port two, through the micro-valve, and through the outlet port. In FIG. 5(b), inlet port one is in a "closed" state and does not allow fluid to flow through this port. In FIG. 5(c) the micro-valve device is shown in the alternative actuated state with inlet port one "open" and connected to the outlet port whereby fluid is allowed to flow through inlet port one, through the micro-valve, and through the outlet port. In FIG. 5(c), inlet port two is in a "closed" state and does not allow fluid to flow through this port.

The micro-valve 50 shown in FIG. 5(a) is shown in the un-actuated state, that is, with no power applied to the actuator. The micro-valve 50 has two inlet ports, inlet port one 54 and inlet port two 53. There is one outlet port 57. In the un-actuated state shown in FIG. 5(a), the micro-valve 50 has both inlet ports, 53 and 54, fluidically connected to the outlet port 57.

The micro-valve 50 shown in FIG. 5(a) is composed of a bottom substrate layer 56 that is electrically conductive, a top substrate layer 55 that is also electrically conductive, and a middle substrate layer 62 that is electrically conductive. An electrically insulating layer 58 electrically insulates the top substrate layer 55 from the middle substrate layer 62, and an electrically insulating layer 59 electrically insulates the bottom substrate layer 56 from the middle substrate layer 62. The micro-valve device 50, has a fluidic chamber 51 wherein the fluid to be controlled by the micro-valve 50 can pass through. Inside the flow chamber 51 of the micro-valve 50, the middle substrate layer 62 has been made thinner and essentially is a membrane 64 that is mechanically compliant. That is, the membrane 64 can be deflected under the action of an actuation force of sufficient magnitude. The membrane 64 is also electrically conductive and is electrically connected to the electrically conductive middle substrate layer 62. The membrane 64 has openings 52 that fluidically connect the top portion of the microvalve chamber 51 to the bottom portion of the microvalve chamber 51 and also fluidically connect the inlet ports, 53 and 54, to the outlet port 57 when the micro-valve 50 is not actuated as shown in FIG. 5(a). Additionally, depending on the exact details of the microvalve 50 design the membrane 64 may be patterned in various shapes and sizes in order to obtain specific design requirements.

As shown in FIG. 5(a), the middle substrate layer 62 is connected to an electrical terminal 61. Additionally, the top substrate layer 55 is connected to an electrical terminal 60, and the bottom substrate layer is connected to an electrical terminal 63. Importantly, in FIG. 5(a), none of the electrical terminals, either 60, 61 or 63, are connected to an applied voltage, since the micro-valve shown in FIG. 5(a) is in an un-actuated state.

The microvalve 50 shown in FIGS. 5(a)-5(c) has sealing rings (or surfaces or valve seats), 66 and 67, the purpose of which is to reduce or eliminate leakage of fluid through the ports when the valve is in a closed position. The sealing rings 66 and 67 also help to reduce stiction effects, whereby the membrane 64 stays stuck to the sealing rings 66 or 67 when it is desired that the membrane 84 separate from the sealing rings 86 or 87.

An actuated state of the micro-valve is shown in FIG. 5(b). An applied voltage potential V 65 is applied across electrical terminal 60 connected to the top substrate layer 55 and electrical terminal 61 connected to the middle substrate layer 62, which is also electrically connected to the membrane 64. The polarity of the applied voltage 65 shown in FIG. 5(b) has the positive side of the voltage potential 65 applied to terminal 60 and the negative side of the voltage potential 65 applied to terminal 61. However, the applied voltage 65 can be reversed with the same effect on actuation of the micro-valve 50. Additionally, one side of the applied voltage potential 65 could be connected to ground also with the same effect on actuation of the micro-valve 50.

When an electrical voltage potential is applied across the terminals 60 and 61 of the micro-valve 50, as shown in FIG. 5(b), electrostatic charges (not shown) will develop on the top substrate layer 55. These electrical charges will be mirrored on the middle substrate layer 62 and the membrane 63. That is, electrical charges of equal magnitude and opposite polarity (not shown) to the electrical charges on the top substrate layer 55 will develop in the middle substrate layer 62 and also the membrane 64.

These electrostatic charges on the top substrate layer 55 and the middle substrate layer 62 that is electrically connected to the membrane 64, result in an electrostatic force of attraction (not shown) to develop between the top substrate layer 55 and the membrane 64. Since the membrane 64 is substantially mechanically compliant, the membrane 64 under the electrostatic forces of attraction will deflect towards the top substrate layer 55 if the electrostatic forces are larger than the mechanical stiffness of the membrane 64. If the applied voltage potential 65 across electrical terminals 60 and 61 is sufficiently large in magnitude, the membrane 64 will be pulled toward and eventually touch the sealing ring 66. This is the so-called "electrostatic pull-in phenomena." The electrically insulating layer 58 will prevent electrical shorting of the electrostatically-charged membrane 64 and the electrostatically-charged top substrate layer 55. The touching of the membrane 64 to the insulating layer 58 on the sealing ring 66 of the top substrate 55 is shown in FIG. 5(b). When the membrane 64 makes sufficient contact to the sealing ring 66, the micro-valve is in a fully actuated state, whereby the inlet port one 54 is closed to the flow of fluid, as shown in FIG. 5(b). In this actuated state, inlet port two 53 is open and fluid can flow into this port, through the micro-valve 50 bottom part of the chamber 51, through the openings 52 in the membrane 64, through the top part of the micro-valve 50 chamber 51, and through the outlet port 57. Therefore, in this state, inlet port one 54 is closed to fluid flow, inlet port two 53 is open to fluid flow, and outlet port 57 is open to fluid flow.

An alternative actuated state of the micro-valve is shown in FIG. 5(c). An applied voltage potential V 68 is applied across electrical terminal 63 connected to the bottom substrate layer 56 and electrical terminal 61 connected to the middle substrate layer 62 that is also electrically connected to the membrane 64. The polarity of the applied voltage 68 shown in FIG. 5(c) has the positive side of the voltage potential 68 applied to terminal 63 and the negative side of the voltage potential 68 applied to terminal 61. However, the applied voltage 68 can be reversed with the same effect on actuation of the micro-valve 50. Additionally, one side of the applied voltage potential 68 could be connected to ground also with the same effect on actuation of the micro-valve 50.

When an electrical voltage potential is applied across the terminals 63 and 61 of the micro-valve 50, as shown in FIG. 5(c), electrostatic charges (not shown) will develop on the bottom substrate layer 56. These electrical charges will be mirrored on the membrane 64. That is, electrical charges of equal magnitude and opposite polarity (not shown) to the electrical charges on the bottom substrate layer 56 will develop on the membrane 64.

These electrostatic charges on the bottom substrate layer 56 and the middle substrate layer 62 that is electrically connected to the membrane 64, result in an electrostatic force of attraction (not shown) to develop between the bottom substrate layer 56 and the membrane 64. Since the membrane 64 is substantially mechanically compliant, the membrane 64 under the electrostatic force of attraction will deflect towards the bottom substrate layer 56 if the electrostatic forces are larger than the mechanical stiffness of the membrane 64. If the applied voltage 68 across electrical terminals 63 and 61 is sufficiently large in magnitude, the membrane 64 will be pulled toward and eventually touch the bottom sealing ring 67. This is the so-called "electrostatic pull-in phenomena." The electrically insulating layer 59 will prevent electrical shorting of the electrostatically-charged membrane 64 and the electrostatically-charged bottom substrate layer 56. The touching of the membrane 64 to the insulating layer 59 is shown in FIG. 5(c). When the membrane 64 makes sufficient contact to the bottom sealing ring 67, the micro-valve is in a fully actuated state, whereby the inlet port two 53 is closed to the flow of fluid. In this actuated state, inlet port one 54 is open and fluid can flow into this port, through the micro-valve 50 top part of the chamber 51, through the openings 52 in the membrane 64, through the top part of the micro-valve 50 chamber 51, and through the outlet port 57. Therefore, in this state, inlet port two 53 is closed to fluid flow, inlet port one 54 is open to fluid flow, and outlet port 57 is open to fluid flow.

As pointed out above, an important feature of the micro-valve 50 shown in FIGS. 5(a)-5(c) is the pressure-balancing scheme of the device 50. Specifically, the inlet fluid pressure inside the micro-valve 50 chamber 51 is present on both sides of the membrane 64 and therefore applies equal fluid pressure over both surfaces of the membrane 64 with the result that the fluid pressure is balanced over both sides of the membrane 64. Therefore, if the fluid pressure is balanced as shown in FIG. 5(a), the micro-valve can be actuated, as shown in FIGS. 5(b) and 5(c), with an actuation pressure that is substantially less than the pressure of the fluid. This is useful when an actuation method has limited amounts or levels of actuation pressure that is available. This is particularly useful when electrostatic actuation is used that inherently has very limited amounts or levels of actuation pressure that can be generated with this actuation method. Noteworthy is that without the feature of pressure-balancing as shown in FIG. 5(a), the actuation method would have to overcome the mechanical stiffness of the membrane 64 and the pressure of the fluid, which can be substantial. However, with pressure balancing, even if the pressure of the fluid is many times larger in magnitude than the electrostatic pressure that can be generated during actuation, the micro-valve 50 membrane can still be actuated as shown in FIGS. 5(b) and 5(c).

An alternative embodiment of a three-way micro-valve 70 of the present invention is shown in FIGS. 6(a) and 6(b). The three-way micro-valve 70 shown in FIGS. 6(a) and 6(b) is electrostatically-actuated and also pressure-balanced, as described herein. In FIG. 6(a), the micro-valve 70 is shown an un-actuated state with inlet port one in an "open" state and connected to the outlet port, thereby allowing fluid to flow through inlet port one, through the micro-valve, and through the outlet port. In this state, inlet port two is in a "closed" state and no fluid can flow through this port. In FIG. 6(b), the micro-valve 70 is shown actuated state with inlet port two in an "open" state and connected to the outlet port, thereby allowing fluid to flow through inlet port two, through the micro-valve, and through the outlet port. In this alternative state, inlet port one is in a "closed" state and no fluid can flow through this port.

The micro-valve 70 shown in FIG. 6(a) is shown in the un-actuated state, that is, with no power applied to the actuator. The micro-valve 70 has two inlet ports, inlet port one 74 and inlet port two 73. There is one outlet port 77. In the un-actuated state shown in FIG. 6(a), the micro-valve 70 has inlet port one 74 fluidically connected to the outlet port 77 and inlet port two 73 is closed to the flow of fluid through the port and consequently through the micro-valve 70.

The micro-valve 70 shown in FIG. 6(a) is composed of a bottom substrate layer 76 that is electrically conductive, a top substrate layer 75 that is also electrically conductive, and a middle substrate layer 82 that is electrically conductive. An electrically insulating layer 78 electrically insulates the top substrate layer 75 from the middle substrate layer 82, and an electrically insulating layer 79 electrically insulates the bottom substrate layer 76 from the middle substrate layer 82. The micro-valve device 70, has a fluidic chamber 71 wherein the fluid to be controlled by the micro-valve 70 can pass through. Inside the flow chamber 71 of the micro-valve 70, the middle substrate layer 84 has been made thinner and essentially is a membrane 84 that is mechanically compliant. That is, the membrane 84 can be deflected under the action of an actuation force of sufficient magnitude. The membrane 84 is also electrically conductive and is electrically connected to the electrically conductive middle substrate layer 82. The membrane 84 has openings 72 that fluidically connect the inlet port one 74 to the outlet port 77 when the micro-valve 70 is not actuated as shown in FIG. 6(*a*). Additionally, depending on the exact details of the microvalve 70 design the membrane 84 may be patterned in various shapes and sizes in order to obtain specific design requirements.

As shown in FIG. 6(*a*), the middle substrate layer 82 is connected to an electrical terminal 81. Additionally, the top substrate layer 75 is connected to an electrical terminal 80 and the bottom substrate layer 76 is connected to an electrical terminal 83. Importantly, in FIG. 6(*a*), none of the electrical terminals, either 80, 81 or 83, are connected to an applied voltage since the micro-valve shown in FIG. 6(*a*) is in the un-actuated state.

The micro-valve 70 shown in FIGS. 6(*a*) and 6(*b*) has sealing rings (or surfaces or valve seats), 86 and 87, the purpose of which is to reduce or eliminate leakage of fluid through the ports when the valve is in a closed position. The sealing rings 86 and 87 also help to reduce stiction effects, whereby the membrane 84 stays stuck to the sealing rings 86 or 87 when it is desired that the membrane 84 separate from the sealing rings 86 or 87.

An actuated state of the micro-valve is shown in FIG. 6(*b*). An applied voltage potential V 85 is applied across electrical terminal 80 electrically connected to the top substrate layer 75 and electrical terminal 81 electrically connected to the middle substrate layer 82 that is also electrically connected to the membrane 84. The polarity of the applied voltage 85 shown in FIG. 6(*b*) has the positive side of the voltage potential 85 applied to terminal 80 and the negative side of the voltage potential 85 applied to terminal 81. However, the applied voltage 85 can be reversed with the same effect on actuation of the micro-valve 70. Additionally, one side of the applied voltage potential 85 could be connected to ground also with the same effect on actuation of the micro-valve 70.

When an electrical voltage potential is applied across the terminals 80 and 81 of the micro-valve 70 as shown in FIG. 6(*b*), electrostatic charges (not shown) will develop on the top substrate layer 75. These electrical charges will be mirrored on the middle substrate layer 82 and the membrane 84. That is, electrical charges of equal magnitude and opposite polarity (not shown) to the electrical charges on the top substrate layer 75 will develop in the middle substrate layer 82 and also the membrane 84.

These electrostatic charges on the top substrate layer 75 and the middle substrate layer 82 that is electrically connected to the membrane 84, result in an electrostatic force of attraction (not shown) to develop between the top substrate layer 75 and the membrane 84. Since the membrane 84 is substantially mechanically compliant, the membrane 84 under the electrostatic force of attraction will deflect towards the top substrate layer 75 if the electrostatic forces are larger than the mechanical stiffness of the membrane 84. If the applied voltage 85 across electrical terminals 80 and 81 is sufficiently large in magnitude, the membrane 84 will be pulled toward and eventually touch sealing ring 86. This is the so-called "electrostatic pull-in phenomena." The electrically insulating layer 78 will prevent electrical shorting of the electrostatically-charged membrane 84 and the electrostatically-charged top substrate layer 75. The touching of the membrane 84 to the insulating layer 78 on the sealing ring 86 is shown in FIG. 6(*b*). When the membrane 84 makes sufficient contact to the sealing ring 86, the micro-valve 70 is in a fully actuated state whereby the inlet port one 74 is closed to the flow of fluid. In this actuated state, inlet port two 73 is open and fluid can flow into this port, through the micro-valve 70 bottom part of the chamber 71, through the openings 72 in the membrane 84, through the top part of the micro-valve 70 chamber 71, and through the outlet port 77. Therefore, in this state, inlet port one 74 is closed to fluid flow, inlet port two 73 is open to fluid flow, and outlet port 77 is open to fluid flow.

The micro-valve 70 shown in FIG. 6(*b*) can be returned to the un-actuated state, shown in FIG. 6(*a*), by turning off or removing the applied voltage potential 85. When the voltage potential 85 is removed, the electrostatic charges on the top substrate layer 75 and the membrane 84 dissipate and the force of attraction between the top substrate layer 75 and the membrane 84 diminishes and eventually goes to zero. In this condition, the mechanical stiffness of the membrane 84 will become larger than the electrostatic force of attraction as the electrostatic forces of attraction diminish and the membrane 84 will return to the un-deflected state as illustration in FIG. 6(*a*).

As noted above, an important feature of the micro-valve 70 shown in FIGS. 6(*a*) and (b) is the pressure-balancing scheme of the device 70. Specifically, the inlet fluid pressure inside the micro-valve 70 fluid chamber 71 is present on most of both sides of the membrane 84 with the exception of the area inside the sealing ring 87 of inlet port two 73. Consequently, there is a nearly equal fluid pressure over both surfaces of the membrane 84 with the result that the fluid pressure (and force) is nearly balanced over both sides of the membrane 84. Therefore, if the fluid pressure is balanced as shown in FIGS. 6(*a*) and 6(*b*), the micro-valve can be actuated, as shown in FIG. 6(*b*) with an actuation pressure that is substantially less than the pressure of the fluid. This is useful when an actuation method has limited amounts or levels of actuation pressure that is available. This is particularly useful when electrostatic actuation is used that inherently has very limited amounts or levels of actuation pressure that can be generated with this actuation method. Noteworthy is that without the feature of pressure-balancing as shown in FIGS. 6(*a*) and 6(*b*), the actuation method would have to overcome the mechanical stiffness of the membrane 84 and the pressure of the fluid, which can be substantial. However, with pressure balancing, even if the pressure of the fluid is many times larger in magnitude than the electrostatic pressure that can be generated during actuation, the microvalve 70 membrane can still be actuated as shown in FIG. 6(*b*).

Figure 5:
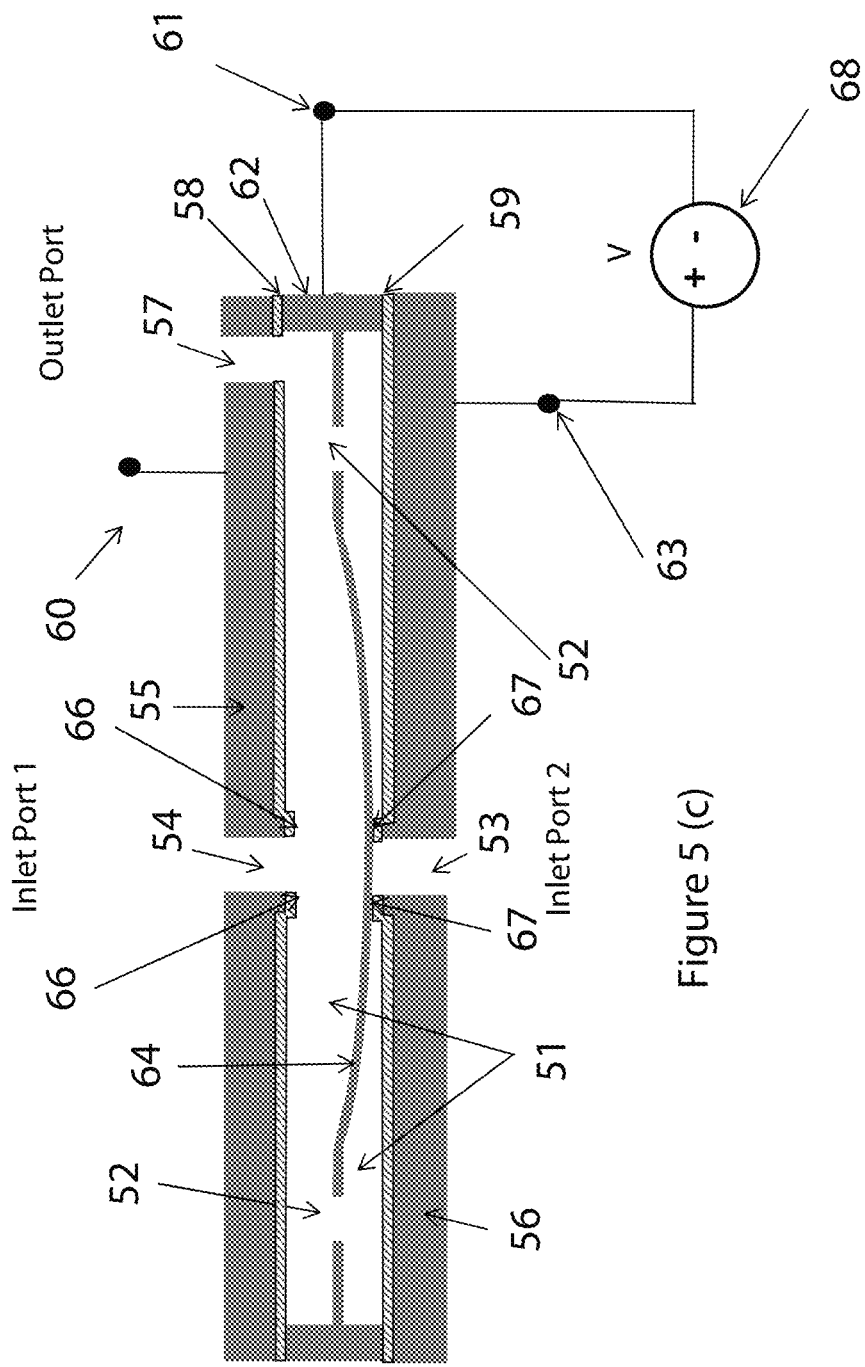
FIGS. 5(a)-5(c) are cross sectional drawings of a pressure-balanced, normally-open, electrostatically-actuated, three-way micro-valve with two inlet ports and one outlet port.

The important distinction between the micro-valve 50 shown in FIGS. 5(*a*)-5(*c*) and the micro-valve 70 shown in FIGS. 6(*a*) and 6(*b*), is that the micro-valve 50 in FIGS. 5(*a*)-5(*c*) is a normally open micro-valve 50, wherein when in an un-actuated state or resting state, fluid is allowed to flow freely through either of the two inlet ports 53 and 54, through the micro-valve 50 chambers 51, and through the outlet port 57. In contrast, the micro-valve 70 shown in FIGS. 6(a) and 6(b) is a normally closed micro-valve 70 at least for inlet port two, 73, when in an un-actuated state.

Additionally, as seen in FIGS. 5(b) and 5(c), actuation of the micro-valve 50 to close either of the inlet ports, 53 and 54, requires the application of separate applied voltages 65 or 68, whereas the micro-valve 70 shown in FIGS. 6(a) and 6(b), requires only one applied voltage potential 85 to actuate the micro-valve. Therefore, the micro-valve 70 shown in FIGS. 6(a) and 6(b) has a less complicated applied voltage requirement compared to the micro-valve 50 shown in FIGS. 5(a)-5(c).

As noted above, the micro-valve 50 and 70 devices shown in FIGS. 5(a)-5(c) and FIGS. 6(a) and 6(b) employ electrostatic actuation as the method for actuating the devices 50 and 70. However, other means can be employed for actuation in either design configuration including: piezoelectric; bimetallic; shape-memory alloy, and thermo-pneumatic.

Figure 7:
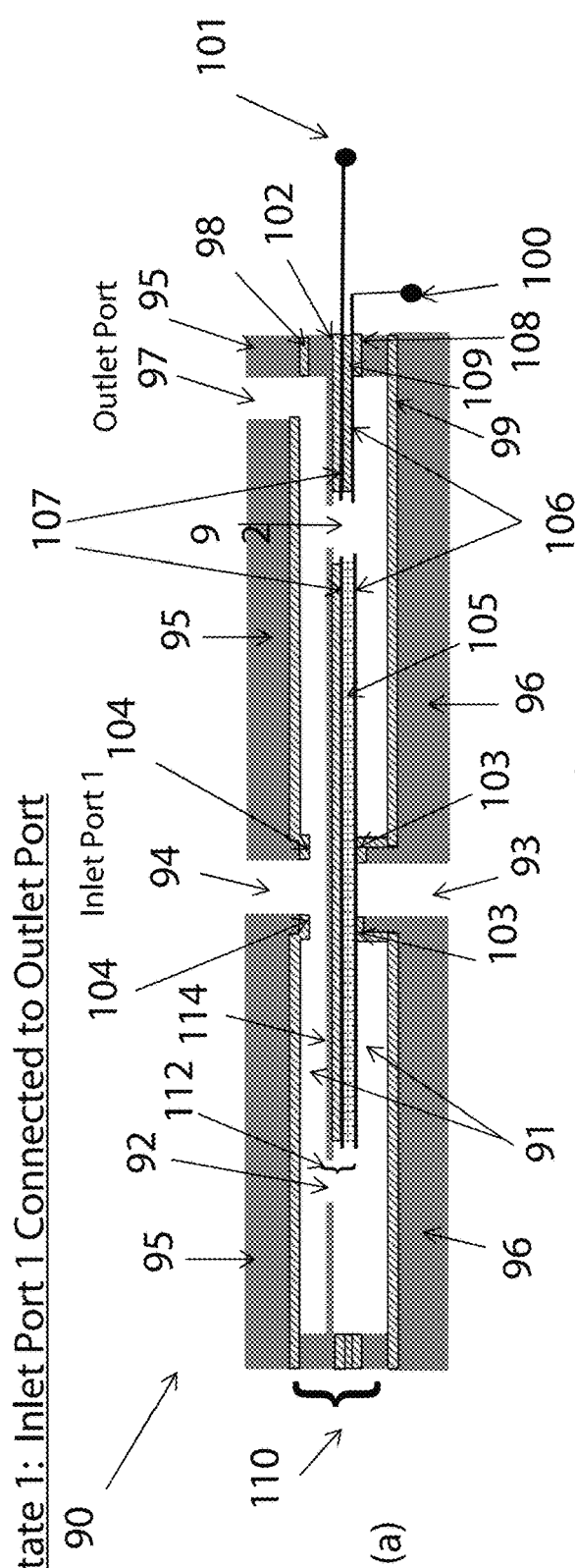
FIGS. 7(a) and 7(b) are cross sectional drawings of a pressure-balanced, normally-closed, piezoelectrically-actuated, three-way micro-valve with two inlet ports and one outlet port.
Figure 7:
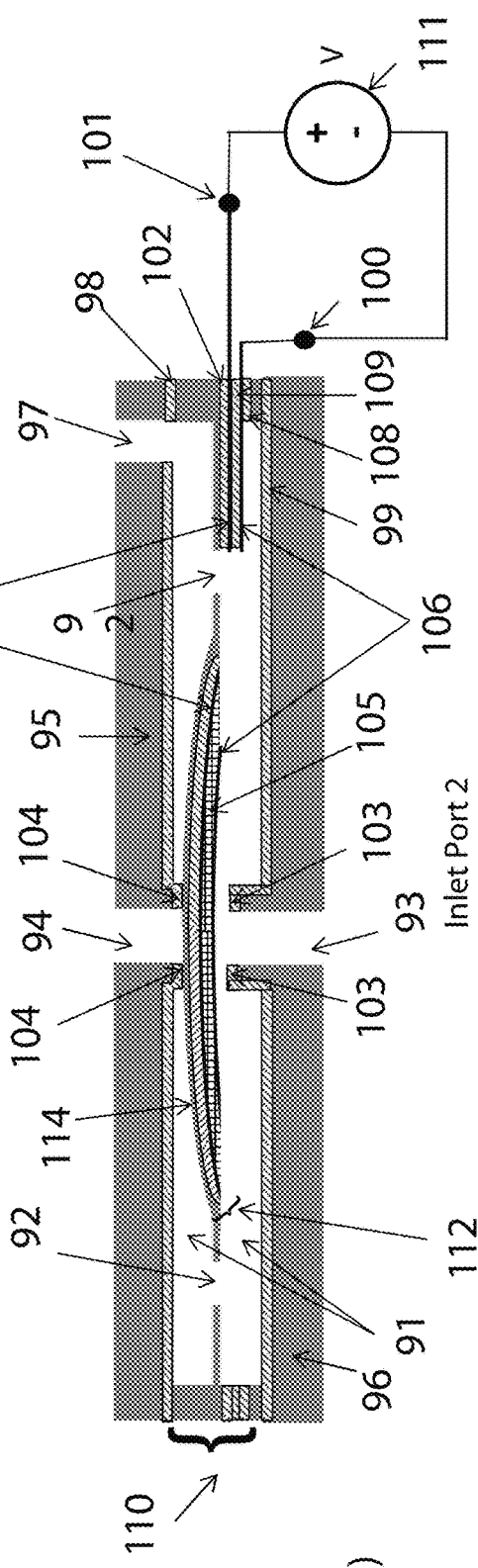

For example, shown in FIGS. 7(a) and 7(b) is a micro-valve 90 of the present invention having a similar design configuration as shown in FIGS. 6(a) and 6(b), but instead the micro-valve 90 uses piezoelectric actuation rather than electrostatic actuation. The 3-way micro-valve 90 shown in FIGS. 7(a) and 7(b) is piezoelectrically-actuated and also pressure-balanced. In FIG. 7(a), the micro-valve is shown an un-actuated state with inlet port one is an "open" state and connected to the outlet port, thereby allowing fluid to flow through inlet port one, through the micro-valve, and through the outlet port. In this state, inlet port two is in a "closed" state and no fluid can flow through this port. In FIG. 7(b) the device is shown actuated state with inlet port two in an "open" state and connected to the outlet port, thereby allowing fluid to flow through inlet port two, through the micro-valve, and through the outlet port. In this state, inlet port one is in a "closed" state and no fluid can flow through this port.

The micro-valve 90 shown in FIG. 7(a) is shown in the un-actuated state, that is, with no power applied to the actuator. The micro-valve 90 has two inlet ports that are inlet port one 94 and inlet port two 93. There is one outlet port 97. In the un-actuated state shown in FIG. 7(a), the micro-valve 90 has inlet port one 94 fluidically connected to the outlet port 97 and inlet port two 93 is closed to the flow of fluid through this inlet port 93 and consequently through the micro-valve 90.

The micro-valve 90 shown in FIG. 7(a) is composed of a bottom substrate layer 96, a top substrate layer 95, and middle substrate layers 110. Middle substrate layers 110 may be composed of a plurality of layers as shown in FIGS. 7(a) and 7(b), so as to implement a configuration that allows the inclusion of a piezoelectric layer 105 in combination with electrode and electrical interconnection layers 106 and 107. Additionally, depending on the exact design configuration details, middle substrate layers may also include one or more insulating layers 102 and 108 on either sides of the electrode and electrical interconnection layers 106 and 107, and an insulating layer 109 to separate the electrode and electrical interconnection layers 106 and 107 where the piezoelectric layer 105 is not present.

An electrically insulating layer 98 may be present to electrically insulate the top substrate layer 95 from the middle substrate layers 110, and an electrically insulating layer 99 may be present to electrically insulate the bottom substrate layer 96 from the middle substrate layers 110. The micro-valve device 90, has a fluidic chamber 91, wherein the fluid to be controlled by the micro-valve 90 can pass through. Inside the flow chamber 91 of the micro-valve 90, is located a mechanically-compliant membrane 112. That is, the membrane 112 can be deflected under the action of an actuation force of sufficient magnitude. The membrane 112 may or may not be electrically conductive, and as shown in FIGS. 7(a) and 7(b), may be composed of a multiplicity of layers (one or more layers) including: a silicon layer 114, one or more piezoelectric layers 105, and electrode layers 106 and 107. In other design and device configurations, the silicon layer 114 may be replaced with an alternative material layer or layers, or may be omitted completely using only a piezoelectric layer 105 and electrodes 106 and 107 in the membrane. Additionally, the silicon layer 114 may be composed of an alternative material layer and may also be in direct contact with the lower sealing ring 103 when the micro-valve 90 is un-actuated. That is, in an alternative configuration, the silicon layer 114 is below the piezoelectric layer 105 and the electrode layers 106 and 107, rather than on top as shown in FIGS. 7(a) and 7(b). Additionally, depending on the exact details of the microvalve 90 design the silicon layer 114, the piezoelectric layer 105, as well as the electrode layers 106 and 107, may be patterned in various shapes and sizes in order to obtain specific design requirements.

The membrane 112 has openings 92 that fluidically connect the inlet port 94 to the outlet port 97 when the micro-valve 90 is not actuated as shown in FIG. 7(a). As shown in FIG. 7(a), the electrode and electrical interconnection layer 107 is connected to an electrical terminal 101. Additionally, electrode and electrical interconnection layer 106 connected electrical terminal 100. Importantly, in FIG. 7(a), the electrical terminals, 100 and 101, are not connected to an applied voltage, since the micro-valve shown in FIG. 7(a) is in the un-actuated state.

The micro-valve 90 shown in FIGS. 7(a) and 7(b) has sealing rings (or surfaces or valve seats), 103 and 104, whose purpose is to reduce or eliminate leakage of fluid through the ports when the valve is in a closed position. The sealing rings 103 and 104 also help to reduce stiction effects, whereby the membrane 112 stays stuck to the sealing rings 103 or 104 when it is desired that the membrane 112 separate from the sealing rings 103 or 104.

An actuated state of the micro-valve 90 is shown in FIG. 7(b). An applied voltage potential 111, V, is applied across electrical terminals 100 and 101 connected to the electrode and electrical interconnect layers 106 and 107 across the piezoelectric layer 105 and acts as the actuator on the membrane layers 112. The polarity of the applied voltage 111 shown in FIG. 7(b) has the positive side of the voltage potential 111 applied to terminal 101 and the negative side of the voltage potential 111 applied to terminal 100. However, the applied voltage 111 can be reversed with the same effect on actuation of the micro-valve 90. Additionally, one side of the applied voltage potential 111 could be connected to ground also with the same effect on actuation of the micro-valve 90.

When an electrical voltage potential is applied across the terminals 100 and 101 of the micro-valve 90, as shown in FIG. 7(b), the electrical field created by the applied voltage potential 111 results in a piezoelectric force (not shown), whereby a strain is produced in the piezoelectric material layer 105. This strain in the piezoelectric layer 105 that part of the membrane layers 112, also causes a strain the membrane layers 112 due to the mechanical coupling of the membrane layers 112 to the piezoelectric layer 105. The consequence of this strain is that the layers of the membrane 112 deflect upwards so as to open the inlet port one 93 of the micro-valve 90 to the flow of fluid. That is, the membrane layers 112 deflect upwards under the action of the strain induced in the piezoelectric layer 105.

Since the membrane layers 112 are substantially mechanically compliant, the membrane layers 112 under the piezoelectric force will deflect towards the top substrate layer 95 if the piezoelectric forces are larger than the mechanical stiffness of the membrane layers 112. If the applied voltage 111 across electrical terminals 100 and 101 is sufficiently large in magnitude, the membrane layers 112 will deflect toward and eventually touch the sealing ring 104. The touching of the membrane layers 112 to the sealing ring 104 is shown in FIG. 7(b). When the membrane layers 112 make sufficient contact to the sealing ring 104, the micro-valve 90 is in a fully actuated state, whereby the inlet port one 94 is closed to the flow of fluid. In this actuated state, inlet port two 93 is open and fluid can flow into this port, through the micro-valve 90 bottom part of the chamber 91, through the openings 92 in the membrane layers 112, through the top part of the micro-valve 90 fluid chamber 91, and through the outlet port 97. Therefore, in this state, inlet port one 94 is closed to fluid flow, inlet port two 93 is open to fluid flow, and outlet port 97 is open to fluid flow.

The micro-valve 90 shown in FIG. 7(b) can be returned to the un-actuated state, shown in FIG. 7(a), by turning off or removing the applied voltage potential 111. When the voltage potential 111 is removed, the piezoelectric forces on the membrane layers 112 dissipate and eventually go to zero. In this condition, the mechanical stiffness of the membrane layers 112 become larger than the piezoelectric forces and the membrane layers 112 will return to the un-deflected state, as illustrated in FIG. 7(a).

An important different between the electrostatically-actuated micro-valve 50 and 70 shown in FIGS. 5(a)-5(c) and 6(a) and 6(b), and the piezoelectrically-actuated micro-valve 90 shown in FIGS. 7(a) and 7(b), is that the electrostatic actuation phenomena is non-linear, whereby the deflection of the membranes 64 and 84 is a non-linear function of the applied voltage potential 68 and 85. Additionally, once the membranes 64 and 84 have deflected a little over ½ of the total distance between the membrane 64 and 84 and substrate 55 and 75, the membrane 64 and 84 snaps to the fully actuation position due to the electrostatic pull-in phenomena. In contrast, the piezoelectric actuator shown in FIGS. 7(a) and 7(b) has a more linear deflection of the membrane with the applied voltage potential.

Another distinction of the micro-valve 90 shown in FIGS. 7(a) and 7(b) compared to the micro-valves 50 and 70 shown in FIGS. 5(a)-5(c) and 6(a) and 6(b) is that the piezoelectric actuation of the micro-valve 90 will typically generate more actuation force than will an electrostatic actuator. The consequence of this higher actuation force is that the micro-valve 90 will have less probability of so-called "stiction" effects, whereby the membrane 112 stays stuck to the sealing ring 103 and 104.

As noted above, an important feature of the micro-valve 90 shown in FIGS. 7(a) and 7(b) is the pressure-balancing scheme of the device 90. Specifically, the inlet fluid pressure inside the micro-valve 90 fluid chamber 91 is present on most of both sides of the membrane layers 112, with the exception of the area inside the sealing ring of inlet port two 103. Consequently, there is a nearly equal fluid pressure over both surfaces of the membrane layers 112 with the result that the fluid pressure is balanced over both sides of the membrane layers 112. Therefore, if the fluid pressure is balanced, as shown in FIGS. 7(a) and (b), the micro-valve 90 can be actuated, as shown in FIG. 7(b), with an actuation pressure that is substantially less than the pressure of the fluid.

Noteworthy is that without the feature of pressure-balancing, as shown in FIGS. 7(a) and 7(b), the actuation method would have to overcome the mechanical stiffness of the membrane layers 112 and the pressure of the fluid, which can be substantial. However, with pressure balancing, even if the pressure of the fluid is many times larger in magnitude than the piezoelectric force that can be generated during actuation, the micro-valve 90 membrane layers 112 can still be actuated, as shown in FIG. 7(b).

The micro-valve 90 shown in FIGS. 7(a) and 7(b) is a normally-closed micro-valve 90, wherein inlet port two 93 is closed to the flow of fluid when the micro-valve 90 is an un-actuated state or resting state.

It is important to note that while an embodiment of a normally-closed micro-valve 90 is shown in FIGS. 7(a) and 7(b), a normally-open design configuration of a pressure-balanced micro-valve, such as shown in FIGS. 5(a)-5(c) using piezoelectric actuation, is also readily possible with the use of one or more piezoelectric layers, so as to be part of the present invention.

While the micro-valves shown in FIGS. 7(a) and 7(b) uses piezoelectric actuation, it is understood that other methods of actuation can be substituted for piezoelectric actuation including: bi-metallic actuation; shape-memory alloy actuation; thermo-pneumatic actuation; and others, and are covered under the present invention.

Method of Fabrication of 3-Way Pressure-Balanced Micro-valve

The method of implementation of the pressure-balanced microvalve is illustrated in cross-sections of the substrate at various points in the fabrication process sequences 120, 150 and 160 of the micro-valve as shown in FIGS. 8(a)-8(h), 9(a)-9(e) and 10(a) and 10(b). The micro-valve fabrication process sequences 120, 150 and 160 shown in FIGS. 8(a)-8(h), 9(a)-9(e) and 10(a) and 10(b) are for the implementation of an electrostatically-actuated pressure-balanced micro-valve, but can be modified so as to implement micro-valves using other methods of actuation such as piezoelectric-actuation, bimetallic actuation, shape-memory alloy actuation, thermo-pneumatic actuation, etc.

The micro-valve process sequence 120 begins in FIG. 8(a)-8(h) with a substrate 121. The substrate 121 can be made of silicon, or alternatively any material compatible with the fabrication process and materials, such as other semiconductors, metal, glass, polymer, or ceramic. The surface of the substrate 121 may be doped using either diffusion or implantation so as to make the surface more electrically conductive (not shown). This doping may be masked in certain regions of the substrate 121 surface. This can be achieved by depositing a masking layer, performing photolithography on the masking layer, followed by etching of the masking layer, followed by introduction of the dopants into the unmasked regions of the surface of the substrate 121. An alternative to introducing dopants into the surface of the substrate 121 is to deposit an electrically conductive material layer (not shown) onto the surface of the substrate 121. This electrically conductive layer may be patterned using photolithography followed by etching so as to pattern the electrically conductive layer into the shape and pattern desired.

Figure 8:
FIGS. 8(a)-8(h) are cross sectional drawings illustrating the fabrication process of the bottom substrate and the movable membrane used for implementation of the pressure-balanced, electrostatically-actuation three-way micro-valve.
Figure 8:
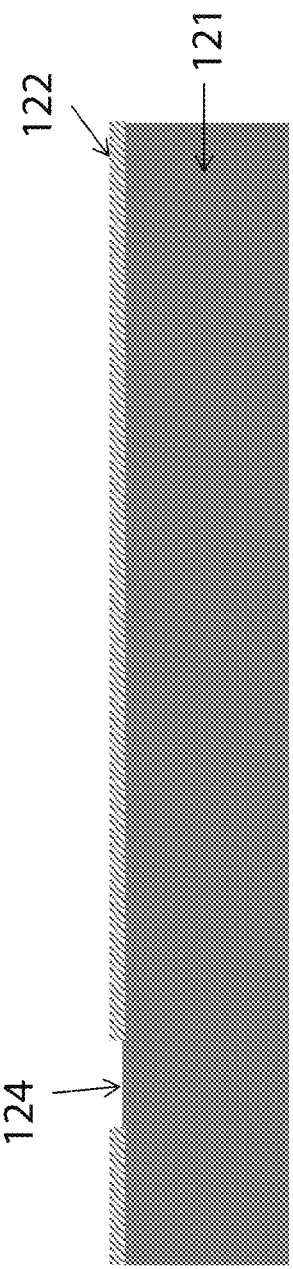
Figure 8:
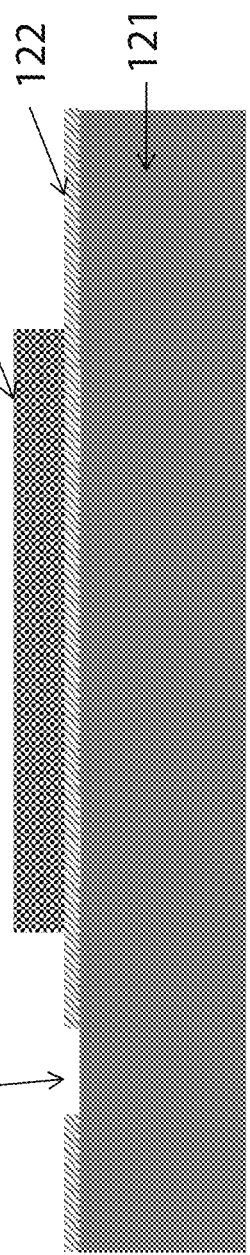
Figure 8:
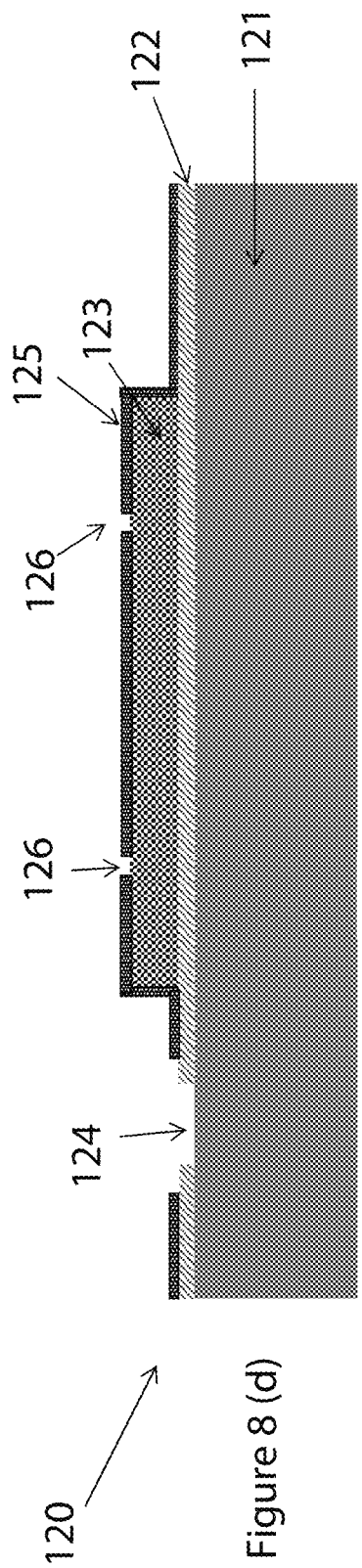
Figure 8:
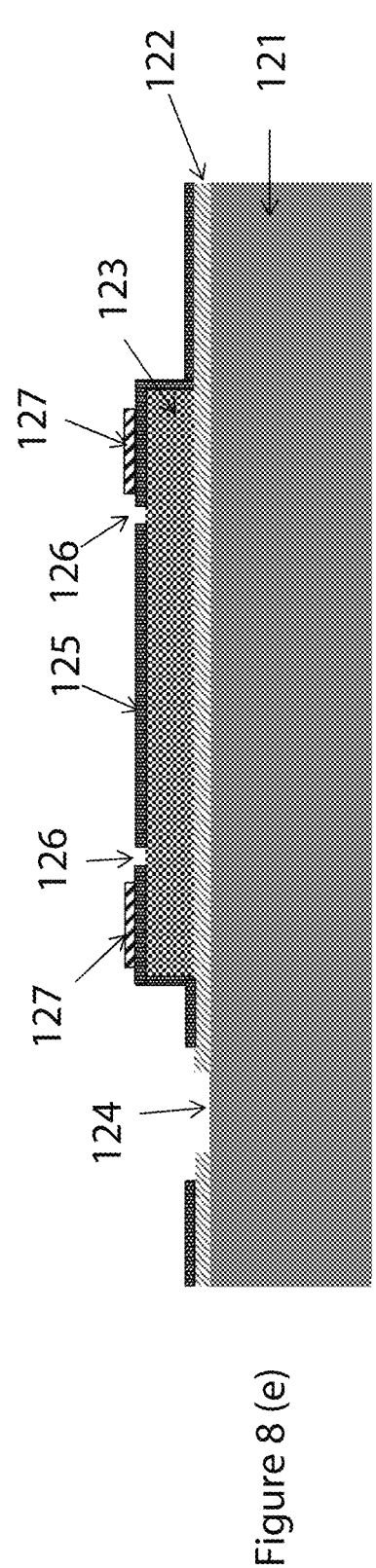
Figure 8:
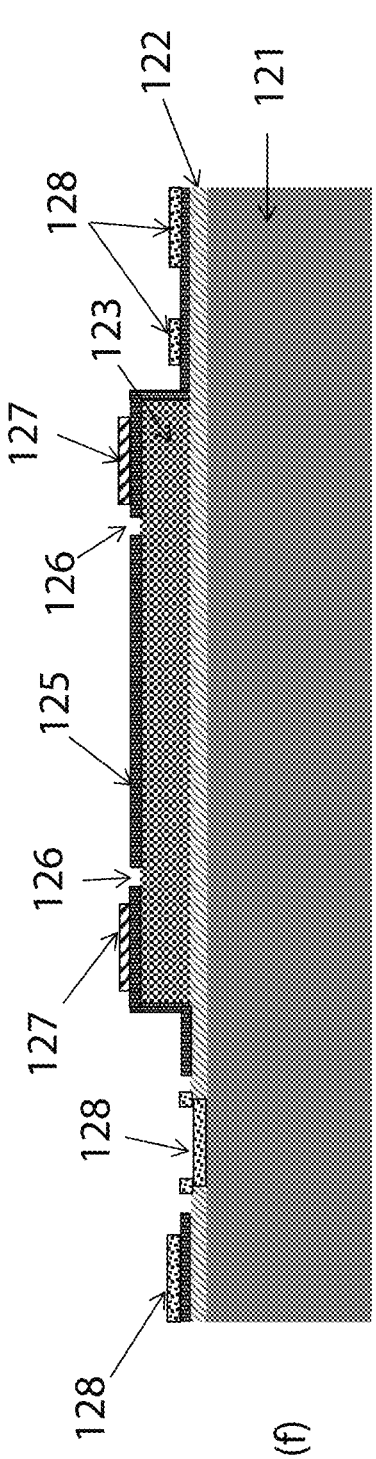

Subsequently, a layer of electrically insulating material 122 is deposited onto the surface of the substrate 121. The electrically insulating material layer 122 can be made from low-stress silicon nitride (LSN) as well as other material layer alternatives such as silicon dioxide (SiO2), alumina, oxy-nitride, as well as any thin film material layer that is electrically insulating. The thickness of the electrically insulating material layer 122 can vary, depending on the exact device design, cost and time considerations, as well as technology considerations. This electrically insulating layer 122 may be patterned using photolithography and etching to open areas 124 in the layer 122 so as to make electrical contact to the underlying electrically conductive substrate 121 or the underlying electrically conductive layer previously deposited (not shown) and possibly patterned as described above. This is shown in FIG. 8(b).

Next, a layer of material 123 that acts as a sacrificial material layer 123 is deposited on top of the electrically insulating layer 122 that was previously deposited onto the substrate 121. This sacrificial material layer 123 can be composed of phosphosilicate glass (PSG) or any material type compatible as a sacrificial layer with the other materials used in fabrication and suitable for microfabrication, such as glasses, ceramics, metals, semiconductors, polymers, etc. The thickness of this sacrificial layer 123 can vary depending on the exact design, cost and time considerations, as well as technology considerations. Subsequently, this layer 123 has photolithography performed on it, followed by etching to pattern the layer 123 as shown in FIG. 8(c).

Subsequently, a layer 125 of electrically conductive material is deposited that acts as a structural layer 125 of the micro-valve. This layer 125 can be composed of polycrystalline silicon (polysilicon), as well as any material type compatible with the other materials used in fabrication and suitable for microfabrication, such as semiconductors, metals, semi-metallic ceramics, etc. The thickness of this structural layer 125 can vary, depending on the exact design, cost and time considerations, as well as technology considerations. This structural layer 125 may be doped so as to make it higher in electrical conductivity. Subsequently, this structural layer 125 has photolithography performed on it, followed by etching to pattern the layer 125 as shown in FIG. 8(d). During the patterning and etching of the structural layer 125, holes 126 that fluidically connect the top and bottom sections of the micro-valve chambers may be made in this layer structural 125. These holes 126 in the structural layer 125 enable the pressure balancing of the micro-valve membrane that will be made from the structural layer 125.

Subsequently, a thin material layer 127 is deposited that will act as a strain-biasing layer 127 on the underlying structural layer 125. This strain-biasing layer 127 will have an internal or residual stress that will cause the underlying structural layer 125 to slightly strain. This strain-biasing layer 127 can be made of Chromium (Cr), as well as any material layer type that is compatible with the other materials used in fabrication and suitable for microfabrication, such as semiconductors, metals, ceramics, etc. The thickness of this strain-biasing layer 127 can vary, depending on the exact design, cost and time considerations, as well as technology considerations. This stain-biasing layer 127 will be patterned as shown in FIG. 8(e) using photolithography followed by etching as are well known in the art. Alternatively, the strain-biasing layer 127 may be patterned using lift-off whereby a photosensitive polymer is first deposited and exposed to patterned the photosensitive polymer, then the strain-biasing layer 127 is deposited, and then, the photosensitive polymer is removed thereby only leaving the strain-biasing layer 127 in those areas where the photosensitive polymer was not present over the surface of the substrate. "Lift-off" is a well-known method for patterning material layers.

Next, an electrically conductive layer 128 of material will be deposited to form metal areas that can act as electrical bonding pads and also as a wafer-to-wafer bonding layer. This electrically conductive material layer 128 may be made of gold, as well as any material layer type that is compatible with the other materials used in fabrication, and that is suitable for microfabrication, electrically conductive, and can be used in wafer-to-wafer bonding. If gold is used as the electrically conductive layer 128, then a very thin adhesion layer (not shown in FIG. 8(f)), such as Chromium or any suitable adhesion material layer, may be deposited prior to the deposition of the layer 128 to ensure good adhesion of the layer 128 to the underlying layers 125 on the substrate 121. The thickness of this electrically conductive layer 128, and accompanying adhesion layer, if used, can vary, depending on the exact design, cost and time considerations, as well as technology considerations. The electrically conductive layer 128 (and accompanying adhesion layer, if used) is appropriately patterned as shown in FIG. 8(f). This layer 128 will be patterned as shown in FIG. 8(f) using either photolithography followed by etching, or lift-off, both of which are well known in the art.

Note that an electrically conductive layer 128 is also deposited and patterned in the regions of the electrically insulating layer 122 that were opened up to expose either the electrically conductive substrate 121 or an electrically conductive material layer (not shown) that was deposited onto the substrate 121. This layer 128 deposited directly onto the substrate 121 in these regions will allow electrical connection to the substrate 121 during micro-valve operations.

Photolithography is then performed on the backside of the substrate 121, and then a through-wafer deep, high-aspect ratio etch, such as Deep, Reactive-Ion Etch (DRIE), is performed to form one or more micro-valve fluid ports 129, as shown in FIG. 8(g). Next, the layer 123 that acts as a sacrificial layer 123 is removed, thereby releasing the structural layer 125 as shown in FIG. 8(h). Note that the strain-biasing layer 127 causes strain in the structural layer 125 upwardly. This upward deflection will enable the micro-valve to be normally closed when the fabrication is completed.

Figure 9:
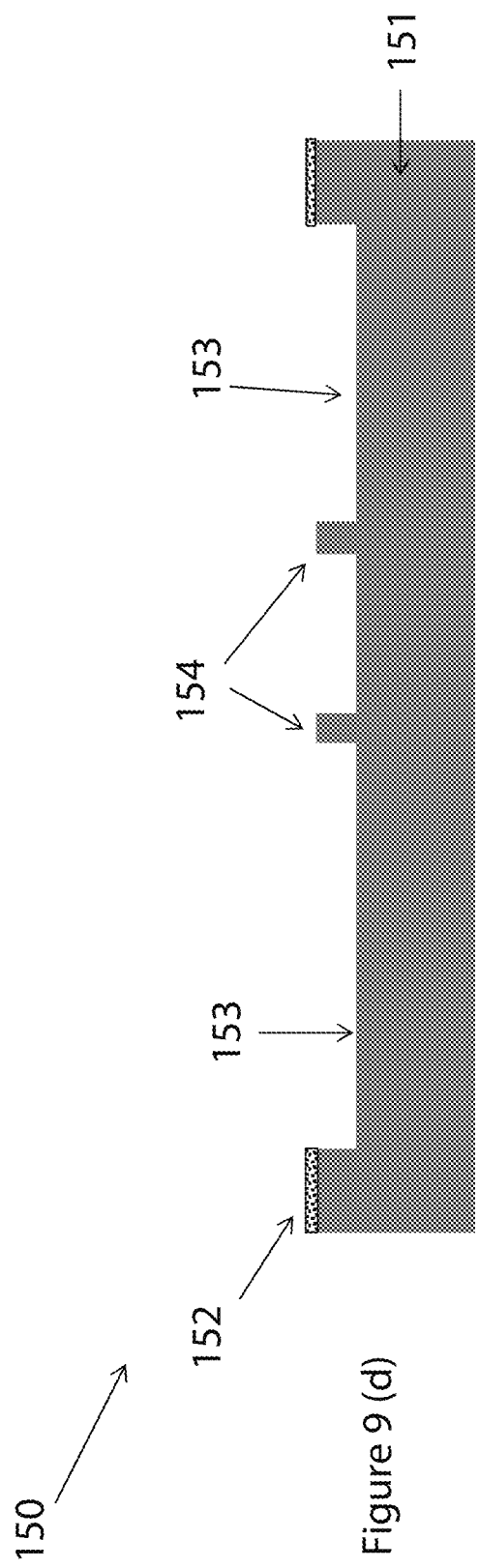
FIGS. 9(a)-9(e) are cross sectional drawings illustrating the fabrication process of the top substrate used for implementation of the pressure-balanced, electrostatically-actuated three-way micro-valve.
Figure 9:
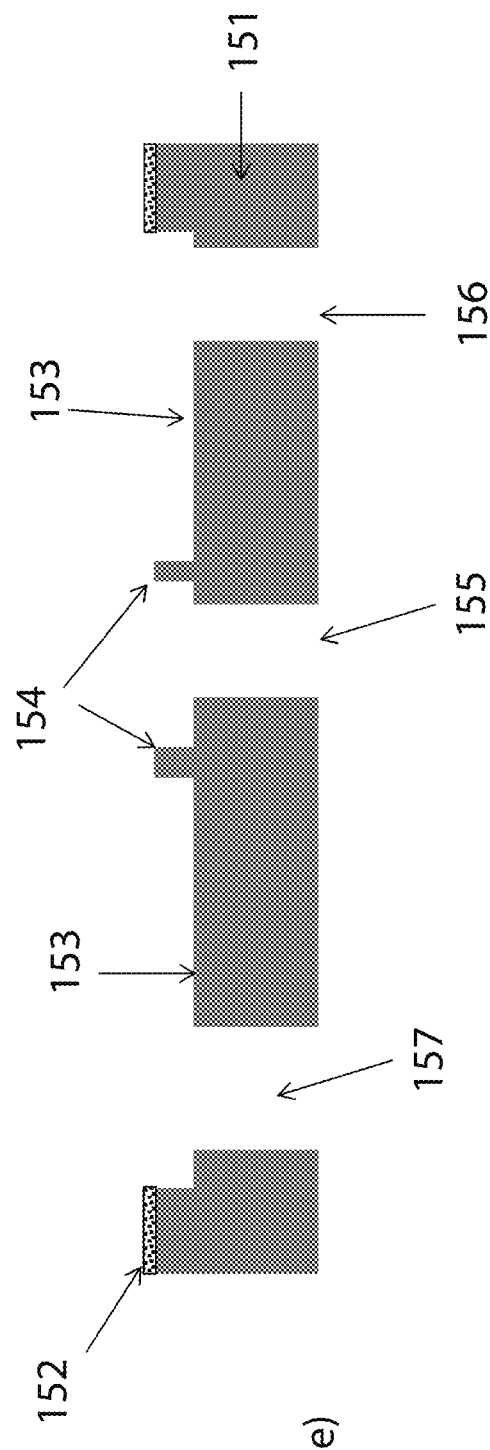

The process sequence 150 continues in FIG. 9(a)-9(e) on a second substrate 151, as shown in FIG. 9(a). The second substrate 151 to be used in the process sequence 150 can be made of silicon, or alternatively, any suitable substrate material compatible with the fabrication process 150 and materials, such as other semiconductors, metal, glass, polymer, or ceramic.

A thin layer of Chrome, or other appropriate material layer, is then deposited that acts as an adhesion layer (the adhesion layer is not shown in FIG. 9(b) since the layer is so thin). This is followed by the deposition of a layer of metal 152, such as gold, that can act to help perform wafer-to-wafer bonding later in the process sequence. The metal and adhesion layers 152 are patterned as shown in FIG. 9(b) using photolithography, followed by etching, or are patterned using lift-off, as shown in FIG. 9(b). Bother techniques are well known in the art.

Next, photolithography is performed on the substrate 151 followed by a deep, high-aspect ratio etch, such as DRIE, partially into the surface of the substrate to form part of the fluid chamber 153 of the micro-valve, as shown in FIG. 9(c).

Subsequently, another photolithography and deep, high-aspect ratio etch, such as DRIE, is performed partially into the surface of the substrate 151 to form the valve seat or sealing ring 154 and complete the making of the fluid chamber 153 of the micro-valve as shown in FIG. 9(d). Alternatively, a material layer for implementing the sealing ring 154 may be deposited, patterned and etched so as to form the shape and structure of the sealing ring 154.

The purpose of the sealing ring 154 is two-fold: the first is to provide better fluid sealing when the micro-valve is closed; and the second is to reduce the stiction effects when the micro-valve is actuated (that is, opened by separating the micro-valve membrane from the sealing ring 154 surface). Typically, the shape of the sealing ring 154 is to have either a narrow width and/or a sharp edge on the surface. The reason for this preferred shape is that it will reduce leakage through the micro-valve when the device is closed to fluid flow and it will also reduce stiction effects between the sealing ring 154 and membrane that may make opening the micro-valve more difficult when the device is to be actuated. The substrate with the sealing rings 154 present is shown in FIG. 9(d).

Photolithography is then performed on the backside of the second substrate 151, followed by the performance of a deep, high-aspect ratio etch, such as DRIE, on the substrate 151 completely through the backside of the substrate 151 to form the microvalve ports 155 and 156, as shown in FIG. 9(e). An inlet port 155 and an outlet port 156 can be made with the same etching. Additionally, a through-substrate via or opening is made in the substrate 157 during this etch that will allow electrical connection to the substrate 121 for electrical actuation of the micro-valve.

Figure 10:
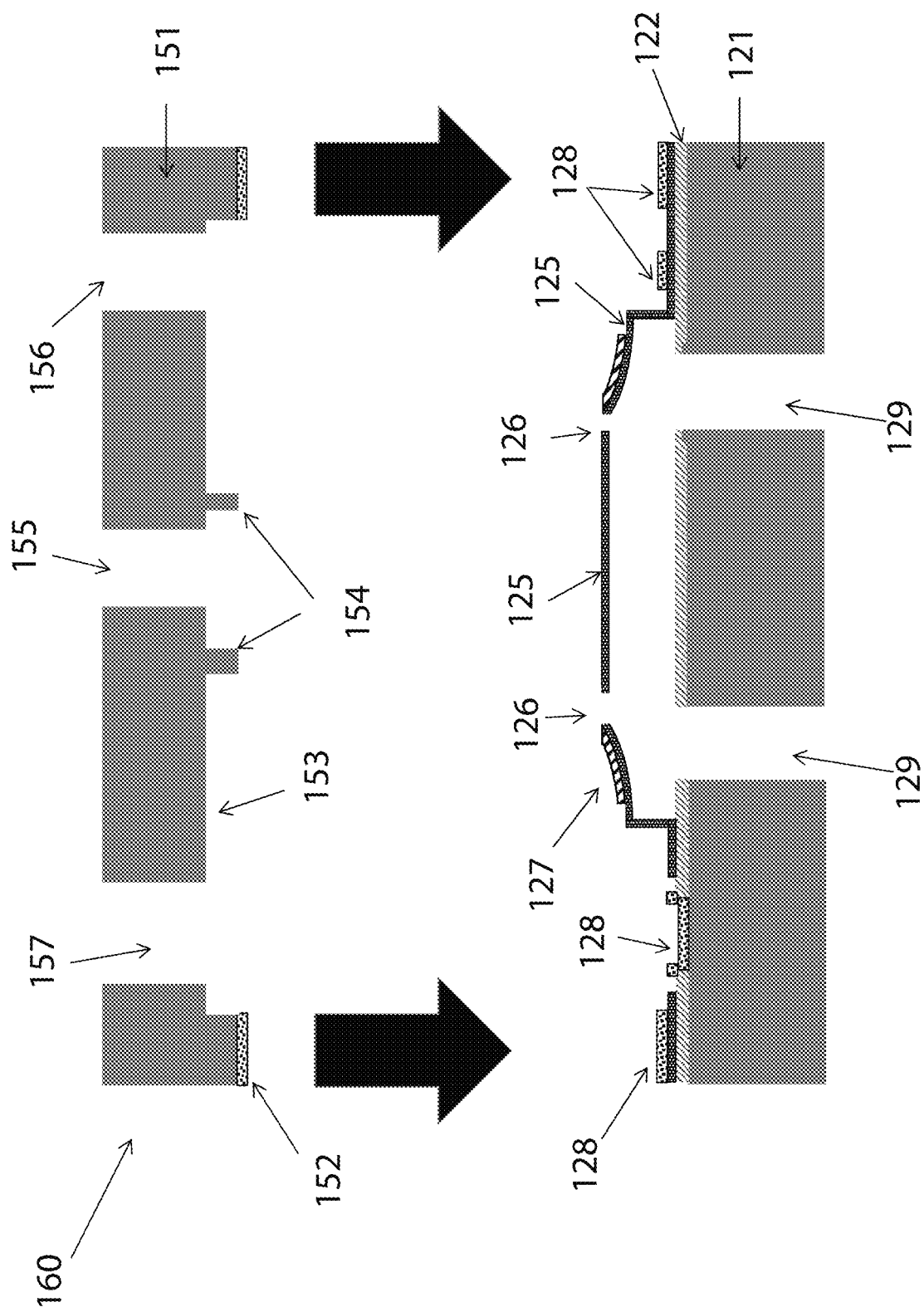
FIGS. 10(a)-10(b) are cross sectional drawings illustrating the fabrication process for the implementation of process pressure-balanced, electrostatically-actuated three-way micro-valve, wherein the top and bottom substrates are joined together to form the micro-valve.
Figure 10:
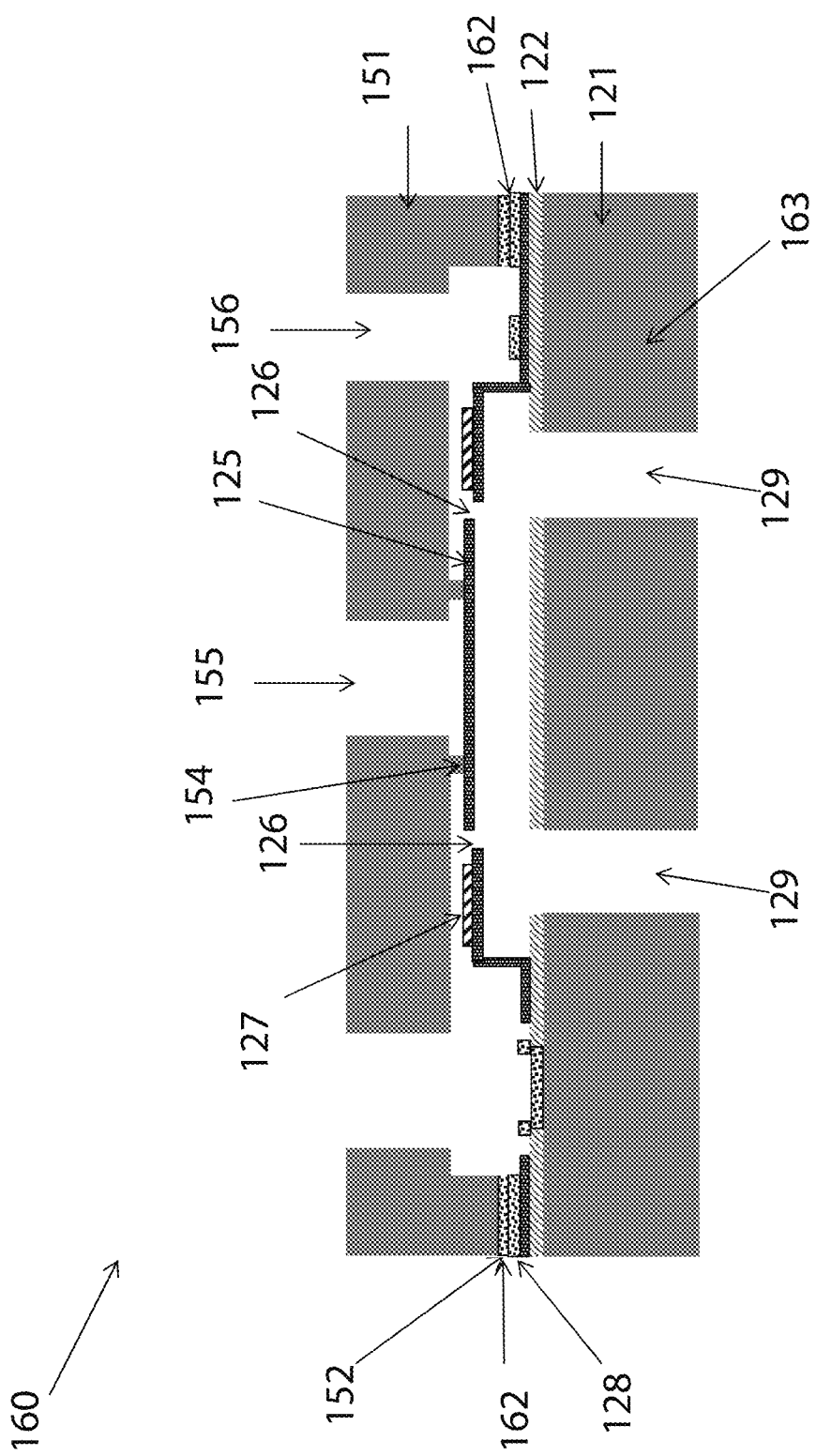

The first substrate from FIG. 8(h) and the second substrate from FIG. 9(e) are then brought together and bonded as shown in FIG. 10(a), by aligning the Gold bonding areas 128 and 152 on the two substrates 121 and 151 and performing a thermo-compression bond 162 thereby resulting in the completed micro-valve structure 163, as shown in FIG. 10(b).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of fabricating a three-way pressure-balanced micro-valve device, the method comprising:
providing a bottom substrate,
micromachining the bottom substrate so as to form in the bottom substrate a bottom fluid chamber having a depth extending partially into the bottom substrate,
forming, in the bottom substrate, at least one fluid port that passes completely through the bottom substrate, so as to fluidically connect to the bottom fluid chamber,
providing a top substrate,
micromachining the top substrate so as to form in the top substrate a top fluid chamber having a depth extending partially into the top substrate,
forming, in the top substrate, at least one fluid port that passes completely through the top substrate, so as to fluidically connect to the top fluid chamber,
micromachining the top substrate to include a valve seat or sealing ring around one of the at least one fluid port in the top substrate,
providing a middle substrate, and
micromachining the middle substrate so as to be a membrane layer with one or more openings to allow fluid to flow from the top fluid chamber to the bottom fluid chamber, or to allow fluid to flow from the bottom fluid chamber to the top fluid chamber, wherein the membrane layer is located near or at the center of a fluid chamber including the top fluid chamber and the bottom fluid chamber, and wherein the bottom substrate or the top substrate includes a plurality of ports.

2. The method of claim 1 for fabricating a three-way micro-valve, wherein either the top substrate or bottom substrate is micromachined to make openings extending completely through the micromachined substrate to provide an electrical connection to the membrane layer for enabling electrical actuation of the micro-valve.

3. The method of claim 1 for fabricating a three-way micro-valve, wherein the fluid ports fabricated completely through the top and bottom substrates are each made using a deep, high-aspect ratio etch.

4. The method of claim 3 for fabricating a three-way micro-valve, wherein the etch used is a Deep, Reactive-Ion Etch (DRIE).

5. The method of claim 1 for fabricating of a three-way micro-valve, wherein the fluid chambers made in the top and bottom substrates are made using a deep, high-aspect ratio etch.

6. The method of claim 5 for fabricating of a three-way micro-valve, wherein the etch used in a Deep, Reactive-Ion Etch (DRIE).

7. The method of claim 1 for fabricating of a three-way micro-valve, wherein the membrane is made of a deposited layer of poly-crystalline silicon (polysilicon).

8. The method of claim 1 for fabricating of a three-way micro-valve further comprising employing material layers that strain-bias the membrane so as to result in a normally-closed micro-valve configuration.

9. The method of claim 1 for fabricating of a three-way micro-valve, wherein the top and bottom substrates are made of silicon.

10. The method of claim 1 for fabricating of a three-way micro-valve, wherein piezoelectric material layers and top and bottom electrodes on both sides of the piezoelectric material layers are made such that top and bottom electrodes enable the micro-valve to be actuated using piezoelectric means of actuation.

11. The method of claim 1 for fabricating a three-way micro-valve, wherein the top and bottom substrates are made from glass, metal, semiconductor, or a ceramic, or a combination thereof.

12. The method of claim 10 wherein the piezoelectric material layers and electrodes are thin-film deposited layers.

13. The method of claim 1 wherein the middle substrate is micromachined such that a top surface of the membrane layer is identical or nearly identical to a bottom surface of the membrane layer.

14. The method of claim 1 wherein the membrane is actuated by the introduction of electro-mechanical forces over a surface of the membrane in the normal direction.

15. The method of claim 1 wherein a plurality of fluid ports are formed in the top substrate.

16. The method of claim 15 wherein a plurality of fluid ports are formed in the bottom substrate.

17. The method of claim 1 further comprising depositing a thin film piezoelectric material layer on a surface of the membrane layer.

18. The method of claim 17 wherein the thin film piezoelectric material layer is deposited on a central portion of the surface of the membrane layer and extends outward from the central portion.

19. The method of claim 1 wherein micromachining the bottom substrate includes providing a valve seat or sealing ring around one of the at least one fluid port in the bottom substrate to form the bottom fluid chamber.

* * * * *